United States Patent
Rho et al.

(10) Patent No.: US 10,290,223 B2
(45) Date of Patent: May 14, 2019

(54) PREDICTIVE RECOMMENDATION ENGINE

(71) Applicant: Pearson Education, Inc., New York, NY (US)

(72) Inventors: Yun Jin Rho, Acton, MA (US); Jacob M. Anderson, Centennial, CO (US); Gennadiy A. Kukartsev, Highlands Ranch, CO (US)

(73) Assignee: Pearson Education, Inc., New York, NY (US)

( * ) Notice: Subject to any disclaimer, the term of this patent is extended or adjusted under 35 U.S.C. 154(b) by 0 days.

(21) Appl. No.: 15/607,205

(22) Filed: May 26, 2017

(65) Prior Publication Data
US 2017/0330474 A1      Nov. 16, 2017

Related U.S. Application Data

(63) Continuation of application No. 14/928,152, filed on Oct. 30, 2015, now Pat. No. 9,667,321.
(Continued)

(51) Int. Cl.
*G09B 7/00*      (2006.01)
*G09B 3/00*      (2006.01)
(Continued)

(52) U.S. Cl.
CPC ............... *G09B 7/07* (2013.01); *G06N 7/005* (2013.01); *G06Q 10/06* (2013.01); *G06Q 50/20* (2013.01);
(Continued)

(58) Field of Classification Search
USPC ............... 375/219, 220, 221, 222, 224, 240, 375/240.26–240.27, 284, 285, 278, 295,
(Continued)

(56) References Cited

U.S. PATENT DOCUMENTS 5,035,625 A  *  7/1991  Munson ................... G09B 7/00
                                                        434/327
5,799,282 A  *  8/1998  Rakshit .................. G06F 19/324
                                                        434/350
(Continued)

FOREIGN PATENT DOCUMENTS

WO        2009/149262 A1    12/2009

OTHER PUBLICATIONS

EP 15794424.0 received an Office Action dated Aug. 20, 2108, all pages.

*Primary Examiner* — Linda Wong
(74) *Attorney, Agent, or Firm* — Kilpatrick Townsend & Stockton LLP

(57) ABSTRACT

Computer processes, systems and methods for alerting a student device when an objective is mastered according to a piecewise Gaussian distribution updated according to a Bayesian method are disclosed herein. The system can include a student device having a network interface to exchange data with a server via a communication network, and an I/O subsystem to convert electrical signals to user interpretable outputs user interface. The system can include a server that can: receive a student identification; retrieve the next learning objective; determine the difficulty level of the next objective problem set; and determine the probability of the student correctly answering the problems in the problem set. The system may also include a teacher device.

20 Claims, 12 Drawing Sheets

Related U.S. Application Data

(60) Provisional application No. 62/073,814, filed on Oct. 31, 2014.

(51) Int. Cl.
*H04L 27/00* (2006.01)
*G09B 7/07* (2006.01)
*H04B 3/54* (2006.01)
*H04L 12/24* (2006.01)
*G06Q 50/20* (2012.01)
*G06Q 10/06* (2012.01)
*G06N 7/00* (2006.01)
*G09B 5/06* (2006.01)
*G09B 7/02* (2006.01)
*H04L 29/06* (2006.01)

(52) U.S. Cl.
CPC ............. *G09B 5/065* (2013.01); *G09B 7/00* (2013.01); *G09B 7/02* (2013.01); *H04B 3/544* (2013.01); *H04L 41/069* (2013.01); *H04L 63/0272* (2013.01); *Y04S 10/54* (2013.01)

(58) Field of Classification Search
USPC ....... 375/316, 324, 340, 346, 347, 354, 356, 375/211, 213, 147, 148, 358; 434/322, 434/350, 362, 323, 236, 327, 346, 351, 434/353, 365; 705/10, 7, 769, E17.014, 705/11, 52
See application file for complete search history.

(56) References Cited

U.S. PATENT DOCUMENTS

| | | | | |
|---|---|---|---|---|
| 6,076,083 A * | 6/2000 | Baker | ................... | G06N 7/005 706/45 |
| 6,484,010 B1 * | 11/2002 | Sheehan | ................... | G09B 7/02 434/118 |
| 6,714,925 B1 * | 3/2004 | Barnhill | ............... | G06K 9/6228 706/48 |
| 7,117,188 B2 * | 10/2006 | Guyon | ................... | G06F 19/24 706/20 |
| 7,308,412 B2 * | 12/2007 | Rakshit | ................ | G06F 19/324 434/350 |
| 7,646,894 B2 * | 1/2010 | Yang | ................... | G06K 9/6278 340/5.53 |
| 7,828,552 B2 | 11/2010 | Shute | | |
| 7,996,345 B2 * | 8/2011 | Golding | ............ | G01C 21/3484 706/14 |
| 8,249,868 B2 | 8/2012 | Lloyd | | |
| 8,533,815 B1 * | 9/2013 | Upson | ................... | H04L 9/3226 713/168 |
| 8,550,822 B2 | 10/2013 | Templin | | |
| 8,666,740 B2 | 3/2014 | Lloyd | | |
| 8,755,737 B1 * | 6/2014 | Galen | ..................... | G09B 7/08 434/352 |
| 8,774,705 B2 * | 7/2014 | Mine | ........................ | G09B 7/02 434/353 |
| 9,483,955 B2 * | 11/2016 | Galen | ..................... | G09B 7/08 |
| 9,542,503 B2 * | 1/2017 | Franceschini | ..... | G06F 17/30958 |
| 9,667,321 B2 | 5/2017 | Rho et al. | | |
| 9,740,985 B2 * | 8/2017 | Byron | ..................... | G06N 7/00 |
| 2002/0016699 A1 * | 2/2002 | Hoggart | ................ | G06F 17/18 703/2 |
| 2002/0052860 A1 * | 5/2002 | Geshwind | ................ | G09B 7/02 706/62 |
| 2002/0111780 A1 * | 8/2002 | Sy | ........................ | G06F 17/18 703/2 |
| 2002/0184020 A1 | 12/2002 | Shinoda | | |
| 2003/0129574 A1 * | 7/2003 | Ferriol | ..................... | G09B 5/00 434/362 |
| 2005/0234763 A1 | 10/2005 | Pinto | | |
| 2006/0040247 A1 | 2/2006 | Templin | | |
| 2006/0117077 A1 | 6/2006 | Kiiveri | | |
| 2006/0204040 A1 | 9/2006 | Freeman | | |
| 2006/0212386 A1 | 9/2006 | Willey | | |
| 2006/0286533 A1 | 12/2006 | Hansen | | |
| 2007/0172808 A1 | 7/2007 | Capone | | |
| 2007/0189611 A1 * | 8/2007 | Yang | .................... | G06K 9/6278 382/228 |
| 2007/0231780 A1 * | 10/2007 | Shulman | .................. | G09B 7/08 434/350 |
| 2007/0288413 A1 * | 12/2007 | Mizuno | .................. | G06N 7/005 706/46 |
| 2008/0015793 A1 | 1/2008 | Ben-Menahem | | |
| 2008/0057480 A1 * | 3/2008 | Packard | ................. | G09B 23/02 434/188 |
| 2008/0319829 A1 | 12/2008 | Hunt | | |
| 2009/0037398 A1 | 2/2009 | Horvitz | | |
| 2009/0047648 A1 * | 2/2009 | Ferreira | .................... | G09B 7/08 434/323 |
| 2009/0209323 A1 * | 8/2009 | Ansari | .................... | A63F 13/10 463/23 |
| 2009/0268830 A1 | 10/2009 | Birru | | |
| 2010/0010878 A1 | 1/2010 | Pinto | | |
| 2010/0092931 A1 * | 4/2010 | McCallum | ............... | G09B 7/04 434/178 |
| 2010/0120422 A1 | 5/2010 | Cheung | | |
| 2010/0190142 A1 | 7/2010 | Gal | | |
| 2011/0125783 A1 * | 5/2011 | Whale | ............... | G06F 17/30011 707/769 |
| 2011/0208680 A1 * | 8/2011 | Bovey | .................... | G06N 7/005 706/12 |
| 2011/0302031 A1 * | 12/2011 | Chen | .............. | G06Q 30/02 705/14.53 |
| 2012/0066142 A1 * | 3/2012 | Jenkins | ............. | G06F 17/30867 705/326 |
| 2012/0265783 A1 | 10/2012 | Kenedy | | |
| 2013/0157245 A1 * | 6/2013 | Basu | ........................ | G09B 7/02 434/362 |
| 2013/0163837 A1 | 6/2013 | Zabair | | |
| 2013/0198047 A1 * | 8/2013 | Houseworth | ........ | G06Q 40/123 705/31 |
| 2013/0226839 A1 | 8/2013 | Archambeau | | |
| 2013/0266925 A1 | 10/2013 | Nunamaker, Jr. | | |
| 2013/0288222 A1 | 10/2013 | Stacy | | |
| 2014/0006029 A1 * | 1/2014 | Stanley | .................... | G10L 15/19 704/254 |
| 2014/0045164 A1 * | 2/2014 | Kearns | ..................... | G09B 7/06 434/353 |
| 2014/0046735 A1 * | 2/2014 | Ashikawa | ........ | G06Q 10/06395 705/7.41 |
| 2014/0081793 A1 * | 3/2014 | Hoffberg | ............ | G06Q 30/0207 705/26.3 |
| 2014/0114148 A1 * | 4/2014 | Shepherd | ................. | A61B 5/168 600/301 |
| 2014/0134588 A1 * | 5/2014 | Capone | .................... | G09B 7/00 434/322 |
| 2014/0141888 A1 | 5/2014 | Pavlish | | |
| 2014/0157371 A1 | 6/2014 | Le Chevalier | | |
| 2014/0170626 A1 * | 6/2014 | Lovett | ................... | G06Q 10/10 434/350 |
| 2014/0279727 A1 * | 9/2014 | Baraniuk | ............... | G06N 99/005 706/11 |
| 2014/0295397 A1 * | 10/2014 | Galen | ..................... | G09B 7/08 434/350 |
| 2014/0316768 A1 * | 10/2014 | Khandekar | ........ | G06F 17/30654 704/9 |
| 2014/0324749 A1 * | 10/2014 | Peters | ..................... | G09B 7/04 706/46 |
| 2014/0351197 A1 * | 11/2014 | Mould | ................ | G06F 19/3437 706/52 |
| 2015/0030165 A1 * | 1/2015 | Risberg | ................ | H04R 29/001 381/58 |
| 2015/0066577 A1 * | 3/2015 | Christiansen | .......... | G06Q 10/06 705/7.28 |
| 2015/0079554 A1 * | 3/2015 | Lee | ......................... | G09B 7/00 434/157 |
| 2015/0104762 A1 * | 4/2015 | Luke | ..................... | G09B 17/00 434/169 |

(56) References Cited

U.S. PATENT DOCUMENTS

| | | | |
|---|---|---|---|
| 2015/0234823 A1* | 8/2015 | Allen | G06F 17/30864 |
| | | | 707/769 |
| 2015/0269854 A1* | 9/2015 | Maharaj | G09B 5/08 |
| | | | 434/353 |
| 2015/0269941 A1 | 9/2015 | Jones | |
| 2015/0316383 A1 | 11/2015 | Donikian | |
| 2015/0317582 A1 | 11/2015 | Nath | |
| 2015/0332372 A1 | 11/2015 | Hariri | |
| 2015/0339299 A1* | 11/2015 | Bagchi | G06F 17/3053 |
| | | | 707/728 |
| 2015/0347508 A1 | 12/2015 | Lang | |
| 2015/0356420 A1 | 12/2015 | Byron | |
| 2016/0042661 A1* | 2/2016 | Minkoff | G09B 19/06 |
| | | | 434/157 |
| 2016/0070791 A1* | 3/2016 | Eberhart | G06F 17/30864 |
| | | | 707/706 |
| 2016/0093232 A1* | 3/2016 | Chong | G09B 19/06 |
| | | | 434/118 |
| 2016/0098938 A1* | 4/2016 | Choi | G09B 7/00 |
| | | | 434/322 |
| 2016/0103981 A1* | 4/2016 | Boss | G06F 21/31 |
| | | | 726/7 |
| 2016/0103982 A1* | 4/2016 | Boss | G06F 21/31 |
| | | | 726/7 |
| 2016/0124999 A1 | 5/2016 | Brenes et al. | |
| 2016/0127010 A1 | 5/2016 | Rho et al. | |
| 2016/0127244 A1 | 5/2016 | Brenes et al. | |
| 2017/0046971 A1* | 2/2017 | Moreno | G09B 19/00 |

* cited by examiner

PREDICTIVE RECOMMENDATION ENGINE

CROSS-REFERENCES TO RELATED APPLICATIONS

This application is a continuation of U.S. application Ser. No. 14/928,152, entitled "PREDICTIVE RECOMMENDATION ENGINE", filed on Oct. 30, 2015, which claims the benefit of U.S. Provisional Application No. 62/073,814, filed on Oct. 31, 2014, the contents of which are incorporated herein by reference in their entirety.

BACKGROUND

This application relates to the field data transmission and network optimization.

A computer network or data network is a telecommunications network which allows computers to exchange data. In computer networks, networked computing devices exchange data with each other along network links (data connections). The connections between nodes are established using either cable media or wireless media. The best-known computer network is the Internet.

Network computer devices that originate, route and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on (i.e. work using) other more specific or more general communications protocols, except for the physical layer that directly deals with the transmission media.

As the volume of data exchanged between nodes in computer networks has increased, the speed of data transmission has become increasingly more important. Although current technologies provide improved speeds as compared to their predecessors, further developments are needed.

BRIEF SUMMARY

One aspect of the present disclosure relates to a system for alerting a user device when an objective is mastered according to a piecewise Gaussian distribution updated according to a Bayesian method. The system includes: a user device including a network interface that can exchange data with a server via a communication network; and an I/O subsystem that can convert electrical signals to user interpretable outputs user interface. The system includes a server. The server can: receive a response from the user device, the response including an encoded data-carrying electrical signal; identify a user associated with the response; receive user attribute data, which user attribute data includes a piecewise Gaussian distribution model of a user skill level and a user error value; identify a next objective, which next objective is an aggregation of data packets; provide a data packet from the aggregation of data packets to the user via the user device; receive a response from the user device; update the user attribute data according to a Bayesian method, which update to the user attribute data updates the piecewise Gaussian distribution model; and generate and provide an alert to the user device indicating master of the objective, which alert includes code to direct the user device to provide an indicator of the received alert via the I/O subsystem.

In some embodiments, the server can receive data packet attribute data, which data packet attribute data can include a Gaussian distribution model of data packet difficulty level. In some embodiments, the server can: determine the user skill level by determining the mode of the piecewise Gaussian distribution; and determine the data packet difficulty level by determining the mode of the Gaussian distribution. In some embodiments, the server can evaluate the response data.

In some embodiments, the user attribute data is updated according to the Bayesian method and according to the evaluation of the response data. In some embodiments, the update of the user attribute data positively shifts the mode of the piecewise Gaussian distribution when a desired response is received. In some embodiments, the update of the user attribute data negatively shifts the mode of the piecewise Gaussian distribution when an undesired response is received.

In some embodiments, providing the data packet includes selecting a data packet for providing. In some embodiments, selecting the data packet includes: identifying a plurality of potential data packets for providing to the user; calculating a packet probability for each of these identified potential data packets, which packet probability is calculated based on the difficulty of the data packet and the user skill level; and identifying one of the plurality of potential data packets for selection when its packet probability is within a desired range. In some embodiments, the indicator of the received alert includes one: an aural indicator; a tactile indicator; and a visual indicator.

One aspect of the present disclosure relates to a method for alerting a user device when an objective is mastered according to a piecewise Gaussian distribution updated according to a Bayesian method. The method includes: receiving a response from a user device including a network interface that can exchange data with a server via a communication network and an I/O subsystem that can convert electrical signals to user interpretable outputs user interface, the response including an encoded data-carrying electrical signal; and identifying a user associated with the response. The method can include: receiving user attribute data, which user attribute data includes a piecewise Gaussian distribution model of a user skill level and a user error value; identifying a next objective, which next objective is an aggregation of data packets; providing a data packet from the aggregation of data packets to the user via the user device; receiving a response from the user device; updating the user attribute data according to a Bayesian method, which update to the user attribute data updates the piecewise Gaussian distribution model; and generating and providing an alert to the user device indicating master of the objective, which alert includes code to direct the user device to provide an indicator of the received alert via the I/O subsystem.

In some embodiments, the method can include receiving data packet attribute data, which data packet attribute data includes a Gaussian distribution model of data packet difficulty level. In some embodiments, the method can include: determining the user skill level by determining the mode of the piecewise Gaussian distribution; and determining the data packet difficulty level by determining the mode of the Gaussian distribution.

In some embodiments, the method includes evaluating the response data, and which user attribute data is updated according to the Bayesian method and according to the evaluation of the response data. In some embodiments, the update of the user attribute data positively shifts the mode of the piecewise Gaussian distribution when a desired response is received. In some embodiments, the update of the user attribute data negatively shifts the mode of the piecewise Gaussian distribution when an undesired response is received.

In some embodiments, providing the data packet includes selecting a data packet for providing. In some embodiments, selecting the data packet includes: identifying a plurality of potential data packets for providing to the user; calculating a packet probability for each of these identified potential data packets, which packet probability is calculated based on the difficulty of the data packet and the user skill level; and identifying one of the plurality of potential data packets for selection when its packet probability is within a desired range. In some embodiments, the indicator of the received alert includes one: an aural indicator; a tactile indicator; and a visual indicator.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
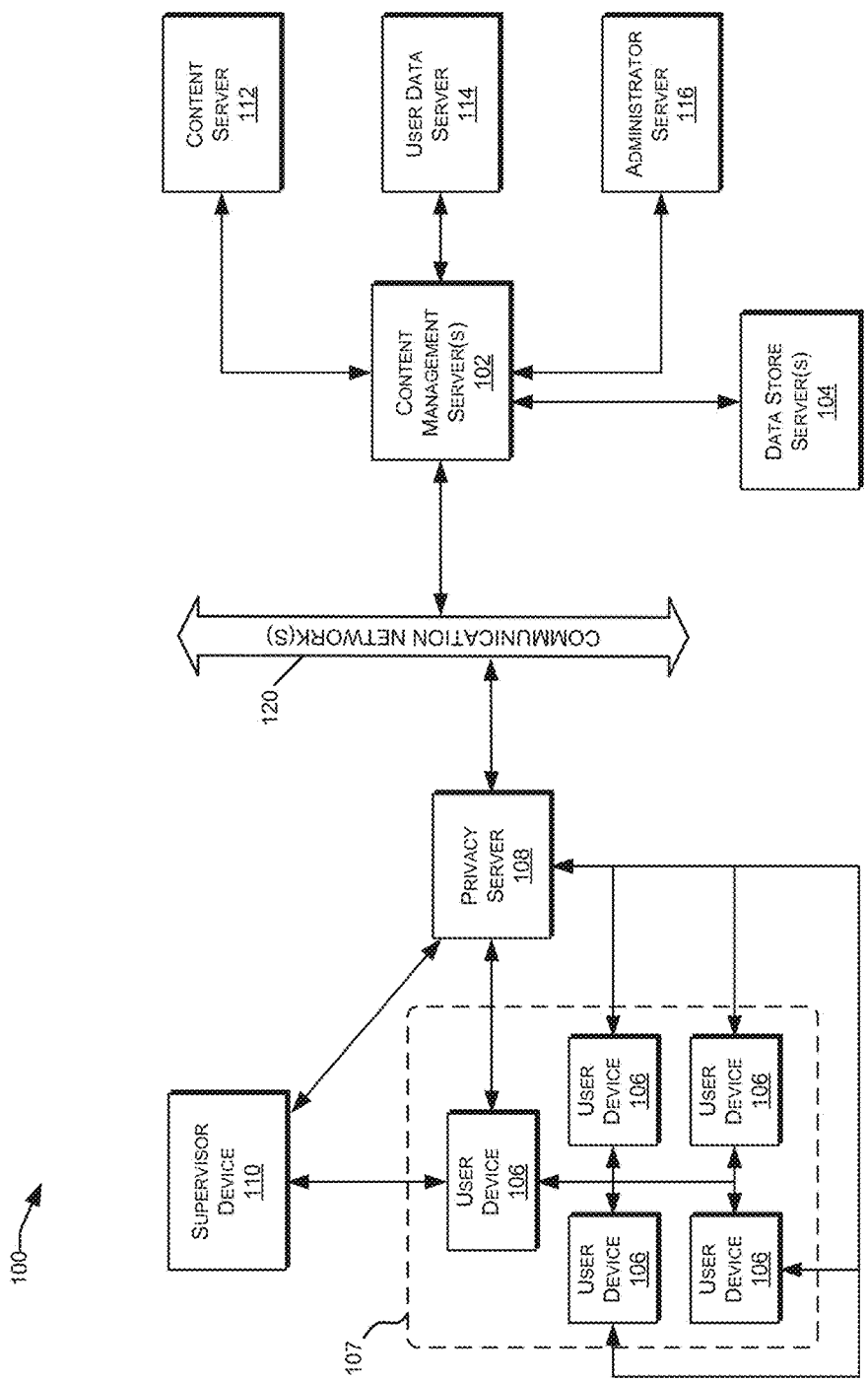
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100, also referred to herein as the prediction system 100, may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming systems, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

In some embodiments, the content distribution network 100 can include a large number of user devices 106 such as, for example, 100, 500, 1,000, 2,000, 4,000, 6,000, 8,000, 10,000, 50,000, 100,000, 250,000, 1,000,000, 5,000,000, 10,000,000, 100,000,000, 500,000,000 and/or any other or intermediate number of user devices 106. In some embodiments, the large number of user devices 106 can enable the functioning of the content distribution network 100. Specifically, the large number of user devices 106 can allow a large number of students to interact with the content distribution network 100 to thereby generate the data volume to enable performing of the methods and processes discussed at length below. In some embodiments, this volume of data can be so large that it cannot be processed by a human. Such a volume of data is referred to herein as a massive data volume.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 114, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

Figure 2:
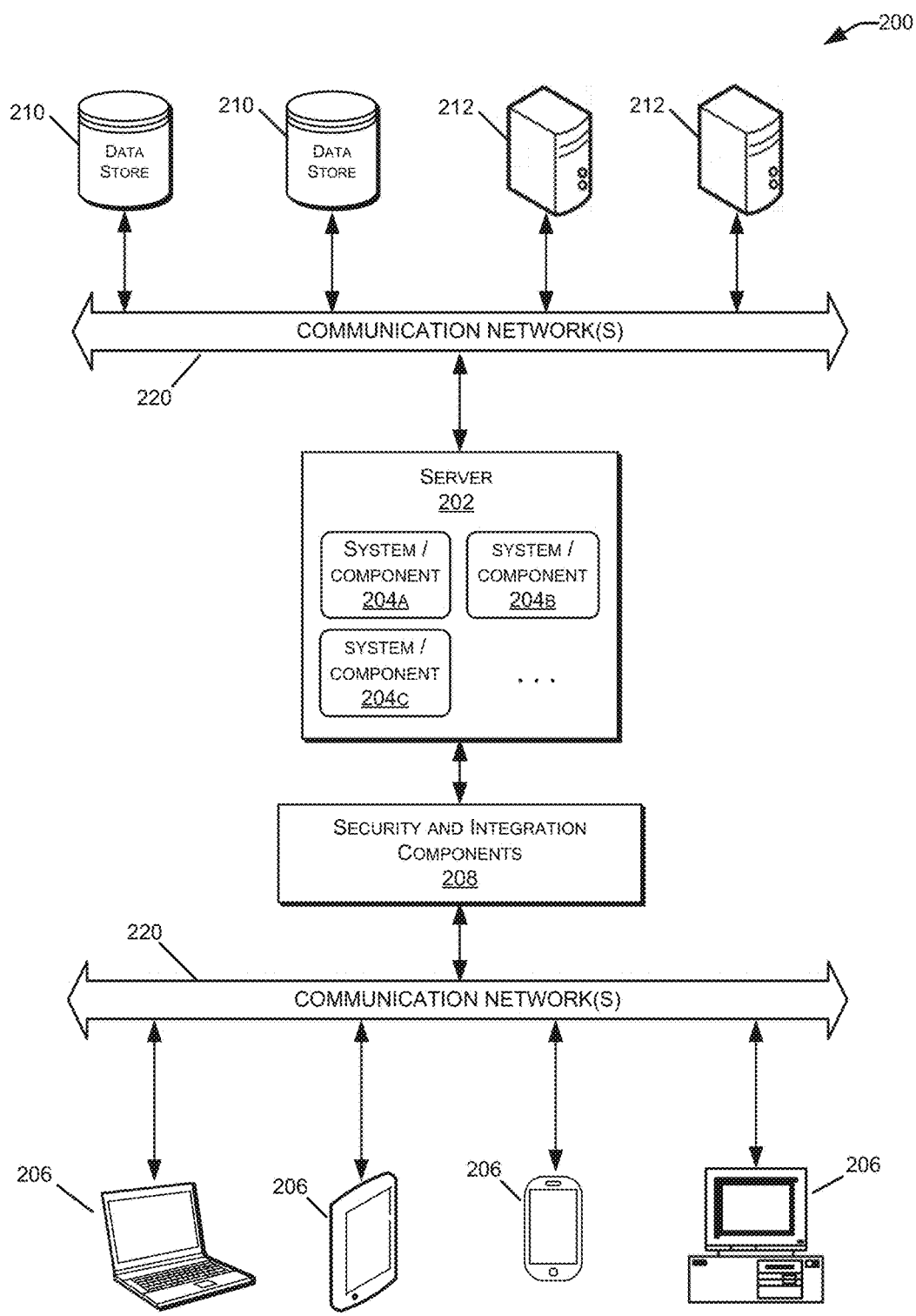
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
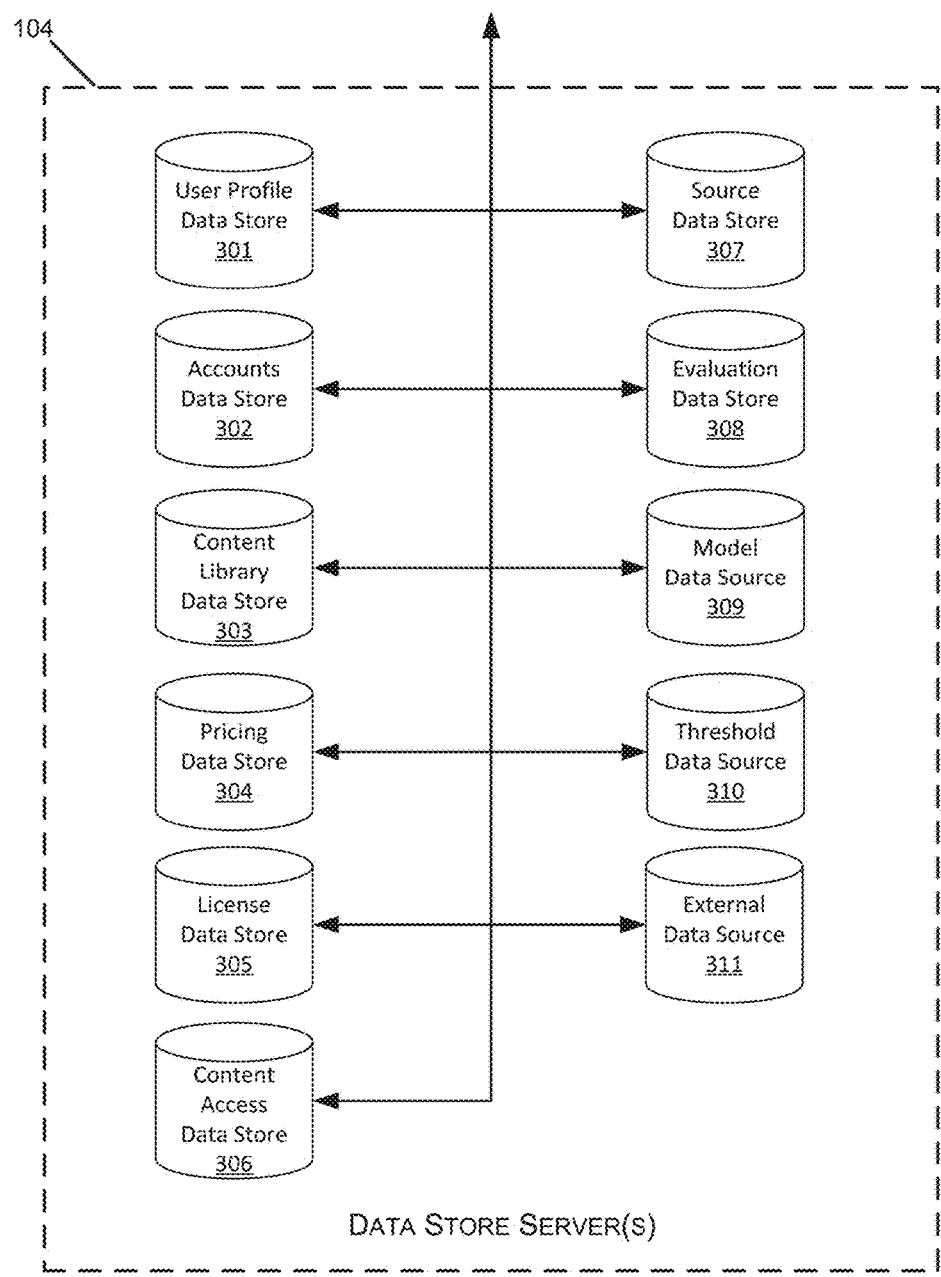
FIG. 3 is a block diagram illustrating an embodiment of one or more data store servers within a content distribution network.

With reference to FIG. 3, an illustrative set of data stores and/or data store servers are shown, corresponding to the data store servers 104 of the content distribution network 100 discussed above in FIG. 1. One or more individual data stores 301-311 may reside in storage on a single computer server 104 (or a single server farm or cluster) under the control of a single entity, or may reside on separate servers operated by different entities and/or at remote locations. In some embodiments, data stores 301-311 may be accessed by the content management server 102 and/or other devices and servers within the network 100 (e.g., user devices 106, supervisor devices 110, administrator servers 116, etc.). Access to one or more of the data stores 301-311 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-311, including their functionality and types of data stored therein, are illustrative and non-limiting. Data stores server architecture, design, and the execution of specific data stores 301-311 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like.

In some embodiments in which the one or several end users are individuals, and specifically are students, the user profile database 301 can further include information relating to these students' academic and/or educational history, which academic and/or educational history can be temporally divided and/or temporally dividable. In some embodiments, this academic and/or education history can be temporally divided and/or temporally dividable into recent and non-recent data. In some embodiments, data can be recent when it has been captured and/or generated within the past two years, within the past year, within the past six months, within the past three months, within the past month, within the past two weeks, within the past week, within the past three days, within the past day, within the past 12 hours, within the past six hours, within the past three hours, and/or within any other or intermediate time period.

In some embodiments, the information within the user profile database 301 can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the student may have one or several preferred learning styles, one or several most effective learning styles, and/or the like. In some embodiments, the students learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

In some embodiments, the data in the use profile database 301 can be segregated and/or divided based on one or several attributes of the data such as, for example, the age of the data, the content relating to which the data was collected, or the like. In some embodiments, this data can identify one or several correct or incorrect answers provided by the student, the expected number of correct or incorrect answers provided by the student, student response times, student learning styles, or the like. In some embodiments, the student database can include a data acceptance curve that can define an expected learning trajectory for one or several students based on historic data for those one or several students and, in some embodiments, also based on one or several predictive models. A data acceptance curve for one or several users is referred to herein as a user data acceptance curve. In some embodiments, the user data acceptance curve can comprise a plurality of data acceptance curves calculated for data packets of different difficulties and/or a plurality of data acceptance curves calculated for data packets having different subject matters or skills.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual data packets, also referred to herein as content items or content resources available via the content distribution network 100. As used herein, a data packet is a group of data providable to a user such as, data for teaching a skill or conveying knowledge and/or for assessing a skill or knowledge. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the content library database 303 can include a plurality of databases such as, for example, a structure database, an aggregate database, a data packet database, also referred to herein as a content item database, which can include a content database and a question database, and a content response database. The content response database can include information used to determine whether a user response to a question was correct or incorrect. In some embodiments, the content response database can further include raw question data including information relating to correct or incorrect responses provided by users and user data associated with some or all of those responses. In some embodiments, this user data can identify one or several attributes of the user such as, for example, any of the user properties discussed above in the user profile database 301. In some embodiments, the content response database can include raw question data including information relating to correct or incorrect responses provided by users and one or several pointers pointing to those users' data in the user profile database 301.

The content item database can include one or several data packets. In some embodiments, the one or several data packets can include, for example, data packets for conveying information to a user, also referred to herein as delivery data packets or delivery content items, and data packets to assess a knowledge level and/or skill level of the user, also referred to as assessment data packets or assessment content items. These data packets can include one or several character strings, text, images, audio, video, or the like. In some embodiments, data packets to convey information to the user can include one or several demonstrations, lectures, readings, lessons, videos or video clips, recordings, audio clips, or the like, and in some embodiments, the data packets to assess a knowledge level and/or skill level of the user can include one or several questions including, for example, one or several short answer questions, essay questions, multiple choice questions, true/false questions, or the like. In some embodiments, the data packets to convey information can be stored in the content database of the data packet database, and in some embodiments, the data packets to assess the knowledge level and/or skill level of the user can be stored in the question database of the data packet database.

In some embodiments, the content item database can include a data acceptance curve that can define an expected learning trajectory for one or several data packets based on historic data for those one or several data packets and, in some embodiments, also based on one or several predictive models. A data acceptance curve for one or several data packets is referred to herein as a data packet acceptance curve. In some embodiments, the data packet acceptance curve can comprise a plurality of data acceptance curves calculated for with data packet user data collected from one or several users. In some embodiments, these one or several user can have different attributes such as different skill levels, different learning styles, or the like.

The aggregate database can include a grouping of data packets including, for example, and grouping of one or both of content items to convey information to a user and content items to assess a knowledge level and/or skill level of the user. This grouping of data packets can be created by a user such as a teacher, instructor, supervisor, or the like. In some embodiments, this grouping of data packets can be created by the user via the supervisor device. In some embodiments, this grouping of data packets can be a lesson that can be given to one or several users.

The structure database can include data identifying a content structure or a knowledge structure that interrelates and interlinks content that can be, for example, stored in others of the databases of, for example, the content library database 303. In some embodiments, for example, the content structure can identify one or several groupings of data packets or grouping categories by which one or several data packets can be identified and/or related. These groupings of data packets can be formed based on the existence or degree of existence of one or several shared attributes among the grouped data packets. In some embodiments, these one or several shared attributes can include, for example, the content of the grouped data packets including one or both of: (1) information is contained in the grouped data packets; and (2) how information is conveyed by the grouped data packets (e.g. text, video, image(s), audio, etc.), a skill or skill level of the grouped data packets, of the like.

In some embodiments, this content can be stored directly in the structure database, and in some embodiments, the structure database can comprise one or several pointers pointing to other databases containing the appropriate content. Thus, in some embodiments, the structure database can contain one or several lessons, one or several questions, and/or one or several answers, some or all of which can be organized and/or connected. In some embodiments, the knowledge database can comprise one or several pointers pointing to one or several lessons in the aggregate database, one or several pointers pointing to one or several data packets that can be, for example, questions, in the data packet database, and/or one or several pointers pointing to one or several responses in the content response database. In some embodiments, and in response to a request from the content management server 102, the pointers in the structure database can be referenced and the desired data can be retrieved from its locations.

In some embodiments, the structure database can further include one or several external content structures. In some embodiments, these external content structures can be pre-existing and can be linked to one or several data packets. In some embodiments, the external content structure can be used to provide an initial organization of the data packets, which initial organization can be altered and/or refined based on information collected from one or several users in response to receipt of one or several of the data packets.

A pricing data store 304, also referred to herein as a pricing database, may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage. In other cases, pricing may be tied to specific content resources. Certain content resources may have associated pricing information, whereas other pricing determinations may be based on the resources accessed, the profiles and/or accounts of the user and the desired level of access (e.g., duration of access, network speed, etc.). Additionally, the pricing data store 304 may include information relating to compilation pricing for groups of content resources, such as group prices and/or price structures for groupings of resources.

A license data store 305, also referred to herein as a license database, may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306, also referred to herein as a content access database, may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307, also referred to herein as a source database, may include information relating to the source of the content resources available via the content distribution network. For example, a source data store 307 may identify the authors and originating devices of content resources, previous pieces of data and/or groups of data originating from the same authors or originating devices, and the like.

An evaluation data store 308, also referred to herein as an evaluation database, may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A model data store 309, also referred to herein as a model database, can store information relating to one or several predictive models. The predictive models can include, for example, a Rasch model, an item response model, a Performance Factor Analysis model, Knowledge Tracing, one or several statistical models, including, for example, one or several normal models, or the like. In some embodiments, the predictive models can be generally applicable to any user of the content distribution network 100 or components thereof, or to content stored in the content distribution network 100. In some embodiments, the predictive models can be customized for one or several selected user and/or selected content.

A threshold database 310, also referred to herein as a threshold database, can store one or several threshold values. These one or several threshold values can delineate between states or conditions. In one exemplary embodiment, for example, a threshold value can delineate between an acceptable user performance and an unacceptable user performance, between content appropriate for a user and content that is inappropriate for a user, or the like.

In addition to the illustrative data stores described above, data store server(s) 104 (e.g., database servers, file-based storage servers, etc.) may include one or more external data aggregators 311. External data aggregators 311 may include third-party data sources accessible to the content management network 100, but not maintained by the content management network 100. External data aggregators 311 may include any electronic information source relating to the users, content resources, or applications of the content distribution network 100. For example, external data aggregators 311 may be third-party data stores containing demographic data, education related data, consumer sales data, health related data, and the like. Illustrative external data aggregators 311 may include, for example, social networking web servers, public records data stores, learning management systems, educational institution servers, business servers, consumer sales data stores, medical record data stores, etc. Data retrieved from various external data aggregators 311 may be used to verify and update user account information, suggest user content, and perform user and content evaluations.

Figure 4:
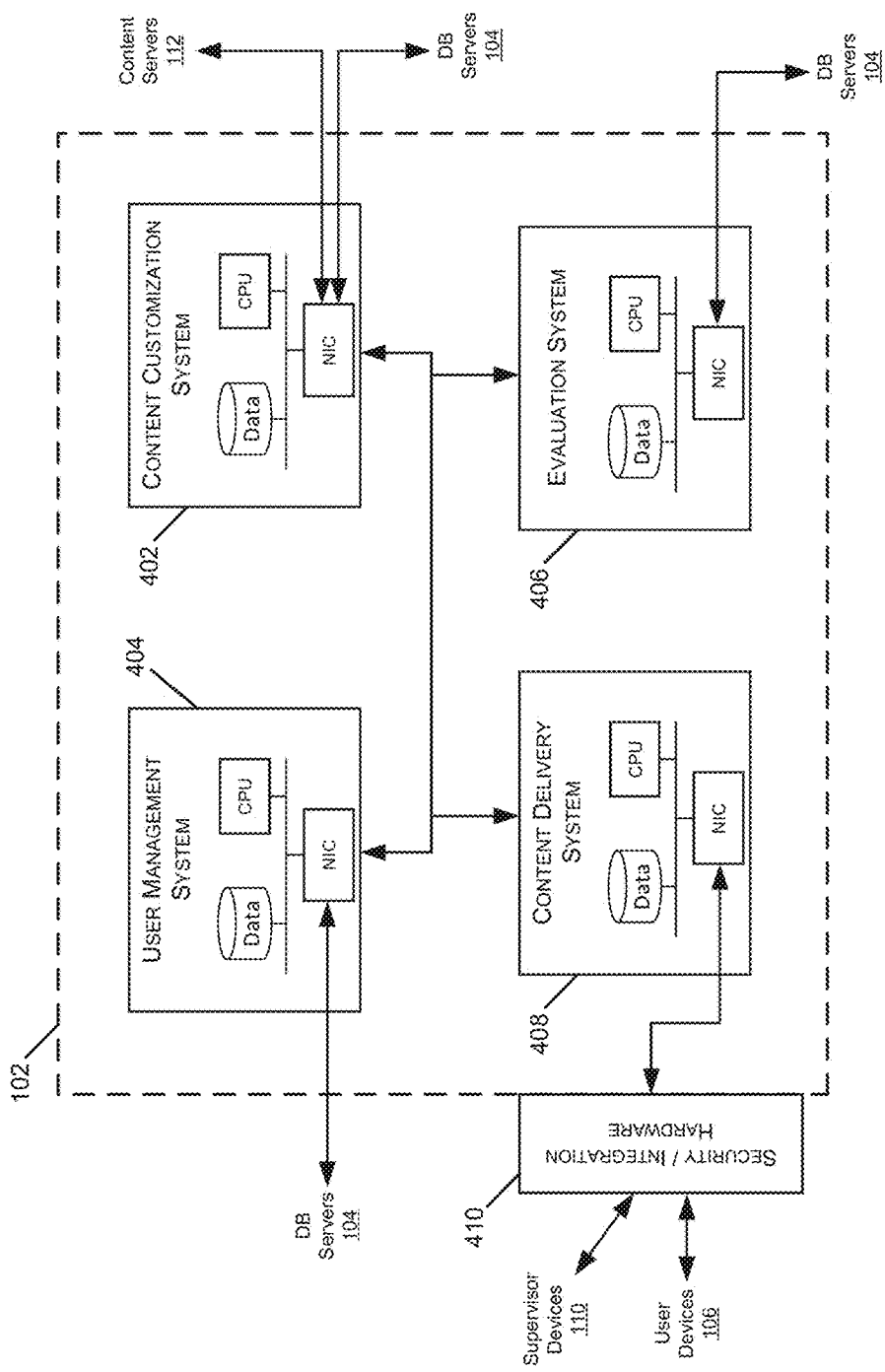
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
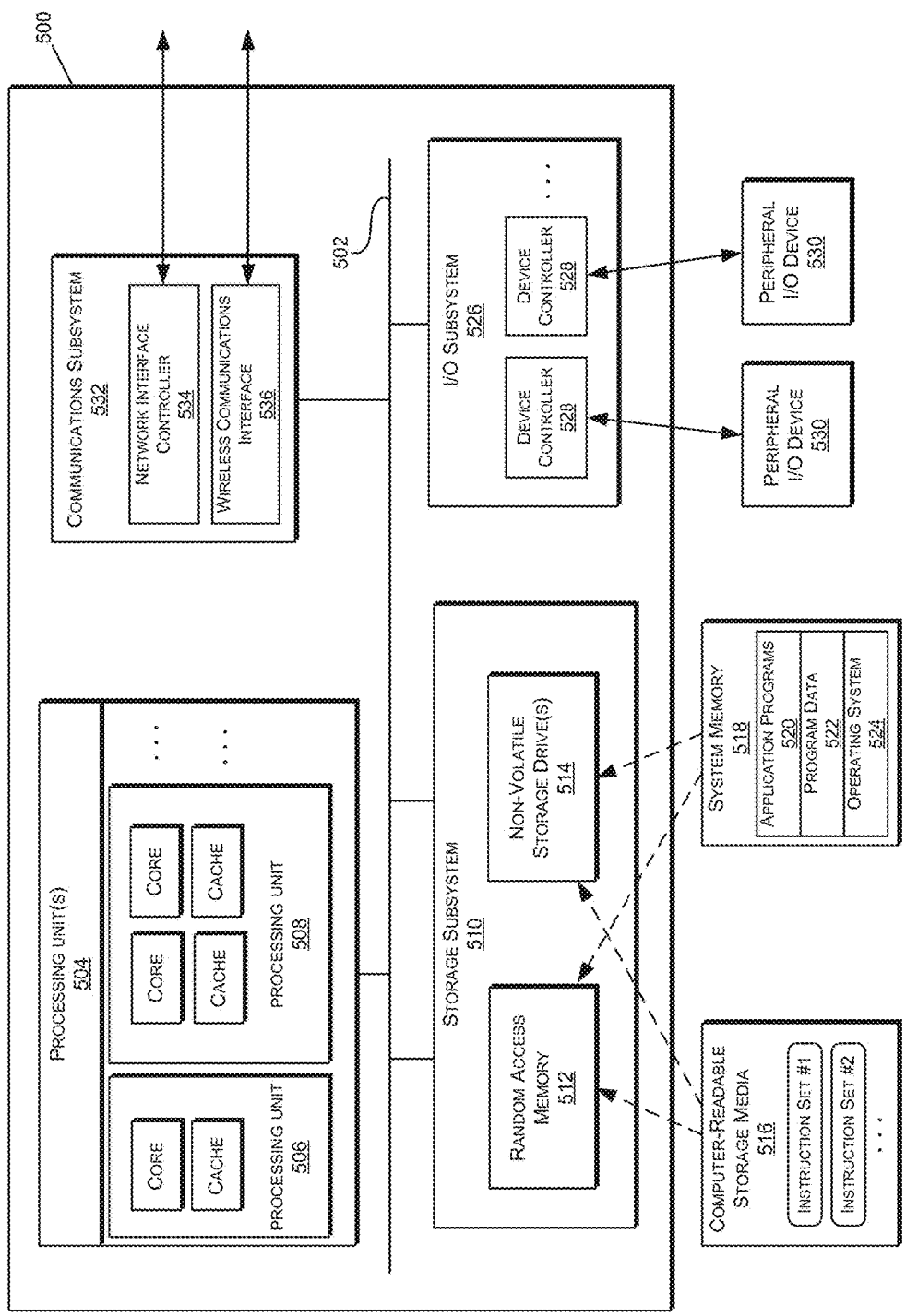
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 518 may be stored in volatile memory (such as random access memory (RAM) 512) and/or in non-volatile storage drives 514 (such as read-only memory (ROM), flash memory, etc.). The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 510 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
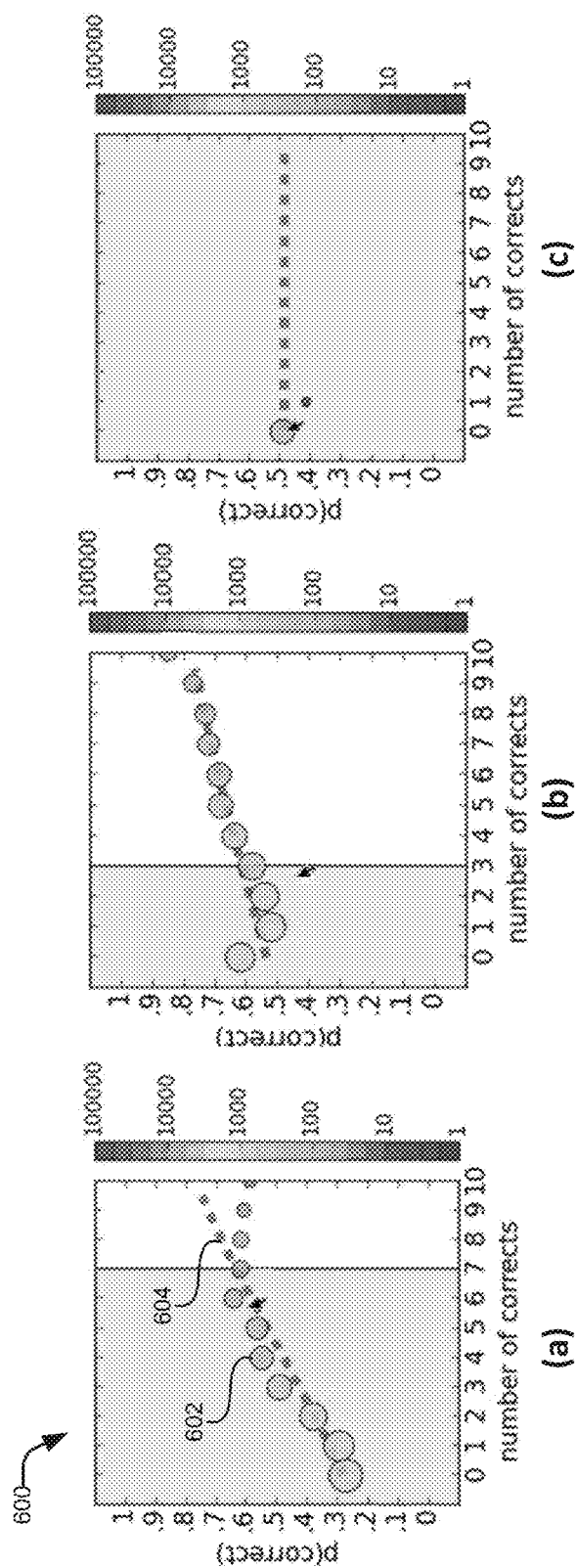
FIG. 6 contains a plurality of images of data acceptance curves.

With reference now to FIG. 6, exemplary images of data acceptance curves 600 which can be either user data acceptance curves or data packet acceptance curves. Each of these images includes an axis labeled a "p(correct)" which identifies a percent of time that a desired response is received for a next provided data packet. Each of these images also includes an axis labeled "number of corrects" which identifies the number of desired responses provided to a category or group of data packets. Each of the images further include indicators 602 that identify aggregated data for one or several users and a trend-line 604 depicting expected user progress based on the some or all of the data represented by the indicators 602.

In some embodiments, a data acceptance curve 600 can be generated for one or several users. In such an embodiment, the data acceptance curve 600 can be based on the interactions of these one or several users with the content distribution network 100, and particularly based on the responses provided by these one or several users to assessment data packets provided by the content distribution network 100. This user data acceptance curve can identify how these one or several users accept data which can include, for example, develop a new skill or skill set, master or learn subject matter, or the like. In such an embodiment, one or several users who have a higher data acceptance rate are indicated by a relatively steeper slope of the trend-line 604 than one or several users with a lower data acceptance rate.

In some embodiments, a data acceptance curve 600 can be generated for one or several data packets. Such content item data acceptance curves can be stored in the content library database 303. In such an embodiment, the data acceptance curve 600 can identify the acceptance of the data of the one or several data packets, particularly vis-à-vis the current grouping of the one or several data packets. This acceptance curve can thus depict the relationship between exposure to related data packets and the likelihood of providing a desired response to the one or several data packets for which the data acceptance curve 600 is created.

The data acceptance curve 600 can be generated with data for one or several users and can be, for example, associated in one of the databases with those one or several users or with one or several data packets. In such an embodiment, the data acceptance curve can provide information relating to an expected outcome for one or several users as the one or several users provide additional desired responses. In such embodiments, the slope of the trend-line 604 can provide an indicator of this expected progress, and specifically, a steep, positive trend-line 604 indicates that a user has historically progressed and/or processed data packets more rapidly than a relatively less steep, positive trend-line 604.

In some embodiments, the data acceptance curves 600 can further provide an indicator between the correlation between data packets, and specifically between one or both of a plurality of assessment data packets and one or several delivery data packets. In some embodiments, for example, a relatively less positively sloped trend-line can indicate a weaker correlation between one or several topics, subjects, and/or skills of a plurality of data packets.

Accordingly, and referring to images (a), (b), and (c) of FIG. 6, image (a) indicates a relatively stronger correlation between the provided data packets associated with the response data represented in image (a) than the correlation of either images (b) and (c), and image (a) likewise indicates that the one or several users associated with the response data represented in image (a) process data faster than those users of images (b) and (c). Similarly, image (c) indicates a relatively weaker correlation between the provided data packets associated with the response data represented in image (c) than the correlation of either images (a) and (b), and image (c) likewise indicates that the one or several users associated with the response data represented in image (c) process data slower than those users of images (a) and (b).

Figure 7:
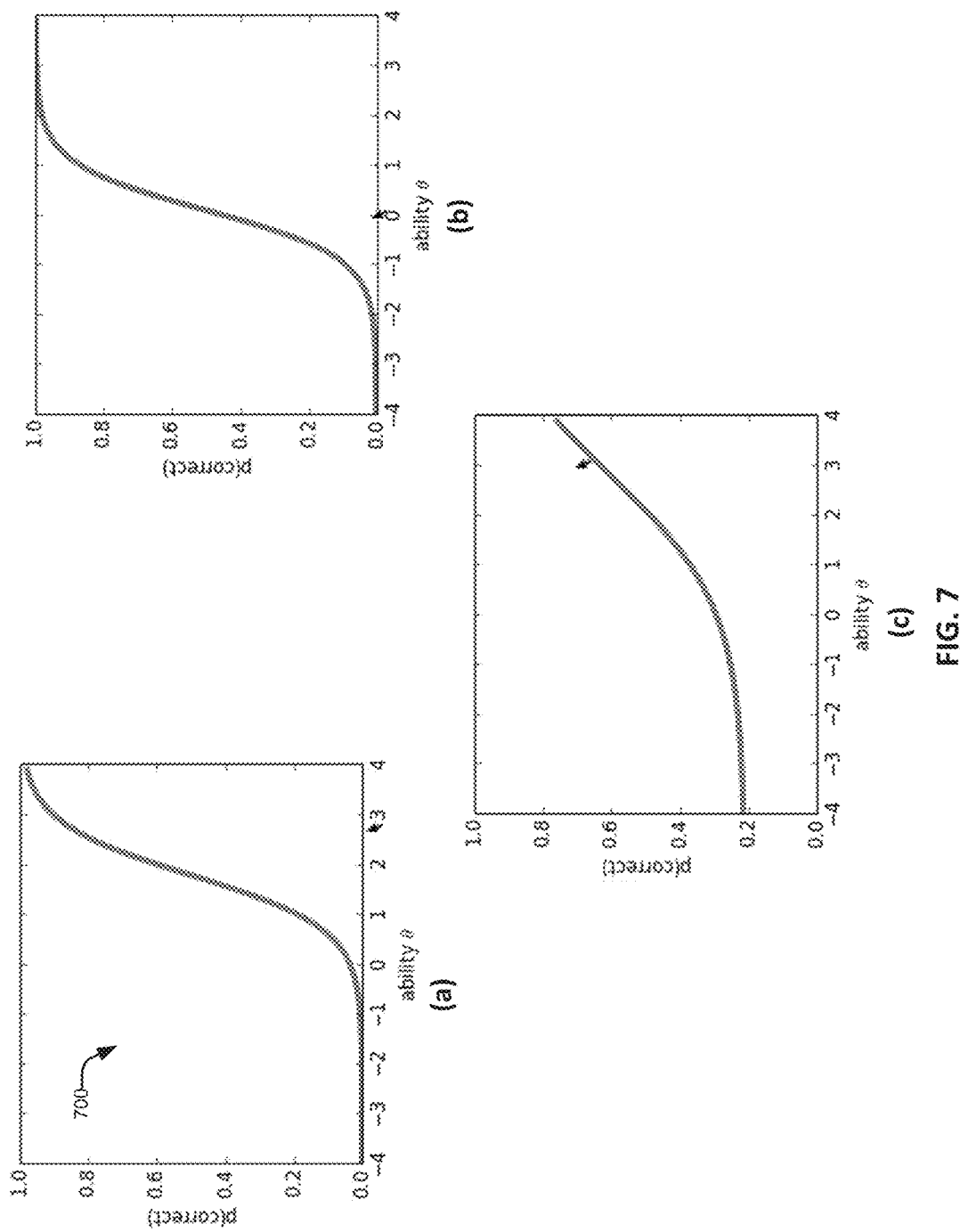
FIG. 7 contains a plurality of images of data packet curves.

With reference now to FIG. 7, a plurality of images of data packet curves 700, also referred to herein as content item curves 700, are shown. The data packets curves can be stored in the content library database 303 and can be, for example, associated with the data packet(s) for which they were created. Each of the images of content item curves in FIG. 7 includes an axis labeled a "p(correct)" which identifies a probability of receiving a desired response to the data packet for which the data packet curve 700 is created. Each of these images further includes an axis labeled "ability θ" that identifies a skill level of one or several users who have responded to the data packet associated with the content item curve 700.

In some embodiments, the data packet curve 700 can include information identifying one or several properties of the data packet including, for example, the difficulty of the data packet, the differentiation of the data packet, and a randomness measure or randomness parameter of the data packet.

In some embodiments, the difficulty of the data packet correlates to the probability of a user providing a desired response to the data packet. Thus, a user, regardless of skill level, will have a lower likelihood of providing the desired response to a first data packet that has a higher difficulty than the likelihood of that user providing the desired response to a second, relatively easier data packet. In some embodiments, the placement of the data packet along the axis labeled "ability θ" indicates the difficulty of the data packet, the width of the curve such indicates the differentiation of the data packet, and the absolute minimum of the data packet curve 700 indicates the randomness measure of the data packet. Thus, the data packet associated with image (a) is more difficult than the data packet associated with image (b).

In some embodiments, the differentiation of a content item describes the degree to which correct and incorrect responses to a data packet distinguish between skill levels. Thus, a data packet having a greater level of differentiation will, across a data set, better distinguish between user skill levels than a data packet having a lower level of differentiation. In some embodiments, the differentiation of a data packet is indicated by the range of ability levels corresponding to non-asymptotic portion of the data packet curve 700, or more generally, by the width of the non-asymptotic portion of the data packet curve 700. Accordingly, both the data packets associated with images (a) and (b) have approximately equal levels of differentiation.

The randomness measure of the data packet characterizes the likelihood of randomly receiving the desired response from a user to that data packet. This randomness can be indicated by a vertical displacement of the data packet curve 700 along the axis labeled "p(correct)." Accordingly, the data packet associated with image (c) is more greatly affected by randomness than the data packets associated with (a) and (b) as a user has a greater than 20 percent chance of providing the desired response, regardless of ability, to the data packet associated with image (c).

Figure 8:
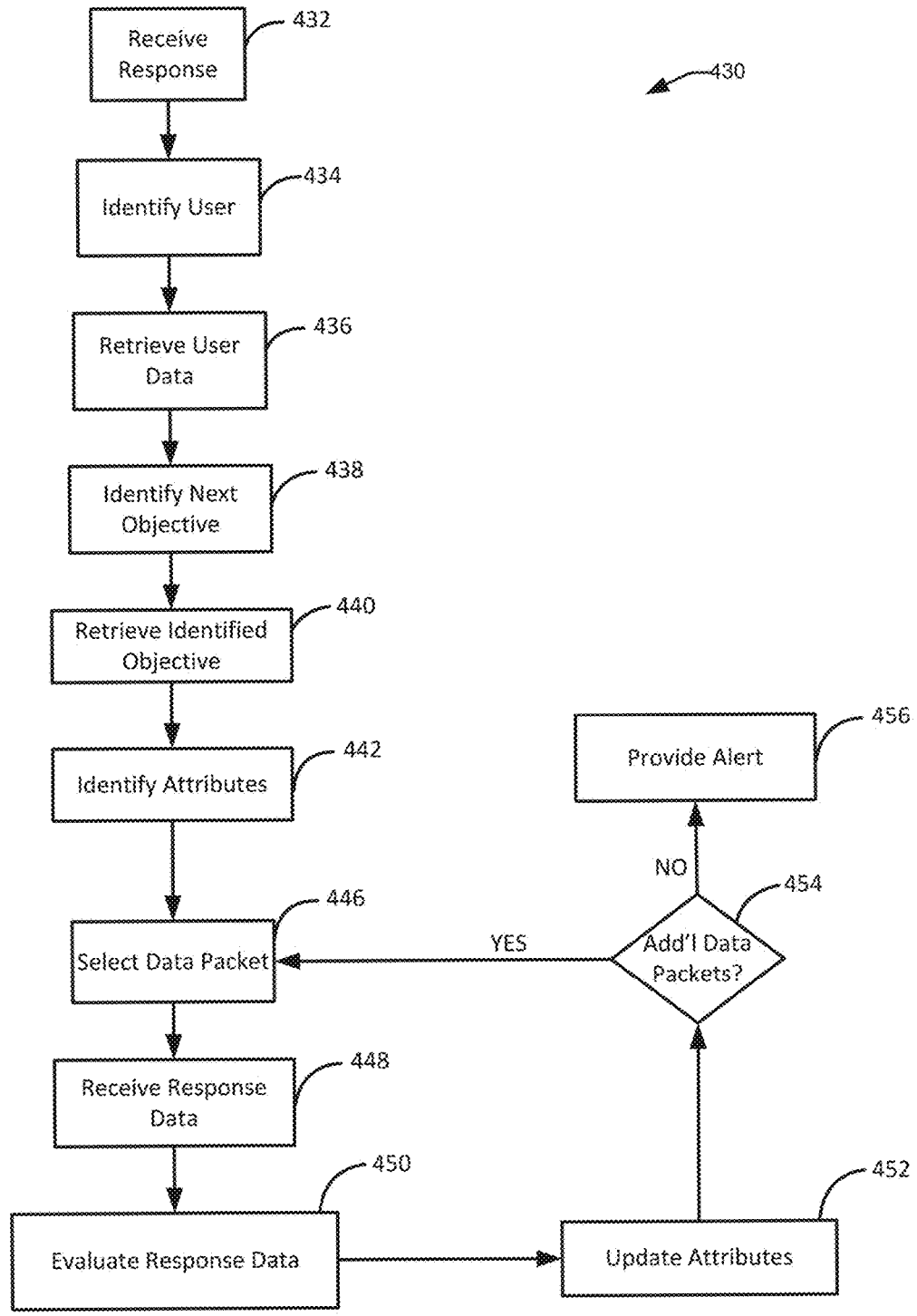
FIG. 8 is a flowchart illustrating one embodiment of a process for generating a predictive recommendation is shown and triggering an alarm based on the predictive recommendation.

With reference now to FIG. 8, a flowchart illustrating one embodiment of a process 430 for generating a predictive recommendation is shown and triggering an alarm based on the predictive recommendation is shown. The process 430 can be performed by the content distribution network 100 and/or one or several components of the content distribution network 100. The process 430 begins at block 432 wherein a response is received. In some embodiments, the response can be a user's response to a previously provided assessment data packet. The response can be received by, for example, the server 102 and/or the privacy server 108 from one of the user devices 106. In some embodiments, the response can be received encoded in one or several data-carrying electrical signals. These signals can include information identifying one or several attributes of the user and/or the user device 106 from which the contribution originated. In some embodiments, these attributes can include, for example, an identification of the user and/or the user device 106, an indicia of the time of sending or receipt of the response, a location of the user and/or user device and the time of the generation and/or sending of the response, or the like.

After the response has been received, the process 430 proceeds to block 434, wherein the user-originator of the response is identified. In some embodiments, the user-originator of the response can be identified from the information received with the response, which information can identify, for example, the user either directly via, for example, a username, a user identification number, a name of the user, or the like, or indirectly via, for example, an identification of a user device 106 that is used exclusively with respect to the content distribution network 100 by the user. In some such embodiments, information identifying the user can be retrieved from a lookup table with the information identifying the user device 106.

After the user has been identified, the process 430 proceeds to block 436, wherein user data is retrieved and/or received. In some embodiments, the retrieved user data can be the data associated with the user identified in block 434. The user data can include any of the information described above with respect to the user profile database 301, and the user data can be retrieved and/or received from the user profile database 301. In some embodiments, the user data can include information that can be used to determine, for example, a skill level of the user, a learning style of the user, a data acceptance rate of the user, an error value and/or confidence interval, or the like.

After the user data has been retrieved, the process 430 proceeds to block 438, wherein the next objective is identified. In some embodiments, an objective, also referred to herein as a learning objective is an aggregation of content, and particularly of data packets, which can include one or several delivery data packets that can be learning content to teach a skill and/or piece of information and/or one or several assessment data packets which can include assessment content that can be used to test whether the student has mastered a skill and/or learned a piece of information. In some embodiments, the objectives can be stored in one of the databases such as, for example, the content library database 303.

In some embodiments, the next learning objective can be identified by identifying one or several learning objectives already completed by the user and one or several knowledge maps outlining an order in which objective can be completed. In some embodiments, the knowledge map can be a database of interconnected objectives, which database can be located in the content library database 303. The knowledge map can identify a plurality of objectives and can identify the prerequisite relationships between these objectives. In some embodiments, the next objective can be identified in the knowledge map as the first uncompleted objective proceeded by a completed objective. Alternatively, in some embodiments, the next objective can be selected by a user input, or the like.

After the next objective has been identified, the process 430 proceeds to block 440, wherein the next objective is retrieved. In some embodiments, this can include the retrieval of information forming the next objective and/or relating to the next objective. Specifically, the retrieval of the next objective can include the retrieval of one or several data packets included in the next objective, including, for example, delivery data packets and assessment data packets. The next objective can be retrieved from the content library database 303.

After the next objective has been retrieved, the process 430 proceeds to block 442, wherein one or several attributes are identified. In some embodiments these one or several attributes can include one or several attributes of the retrieved objective and/or the data packets in the next objective, and/or one or several attributes of the identified user. In some embodiments, these attributes, whether of the user or of the objective can identify performance level which can be a skill level of the user or a difficulty level of the object or the data packets in the objective.

In some embodiments, the performance level can be a default performance level. Specifically, in some embodiments in which a user is beginning an objective, and in which the user attribute data is specific to a single objective or to a group of objectives not including the identified next objective, the performance level, and specifically, the user skill level can be based on a default skill level. In some embodiments, the default skill level can be an average skill level for the identified next objective.

In some embodiments, the performance level can be based on previously gathered performance data and/or error data. In some embodiments, the attributes can further include one or several values, such as an error value, indicating a confidence in the identified performance level and/or an estimate of the error range about the identified performance level in which the actual skill level of a user or the actual difficulty of an objective lies. In some embodiments, for example, the actual skill level of the user can differ from the skill level identified in the user data. In such an embodiment, the error value, also referred to herein as error level, can identify a range about the user skill level containing the actual skill level of the user. The one or several attributes of the user can be identified and/or determined by the server 102.

In some embodiments, the one or several attributes can be represented and/or determined through one or several models, such as statistical models. In some embodiments, these models can be continuously or periodically updated by the content distribution network 100 when one or several new responses are received. In some embodiments, these models can be stored in, for example, the user profile database 301, the model database 309, or any of the other databases 104. In some embodiments, a model can be associated with a single objective such that the model is not applicable to other objectives, and in some embodiments, the model can be associated with a plurality of objectives.

In some embodiments, a user skill level and/or a data packet difficulty level can be determined via a model based on, for example, a Gaussian distribution. In some embodiments, the data packet difficulty can be determined from the mode of a Gaussian distribution, and a user skill level can be determined from the mode of a piece-wise Gaussian distribution.

Figure 9:
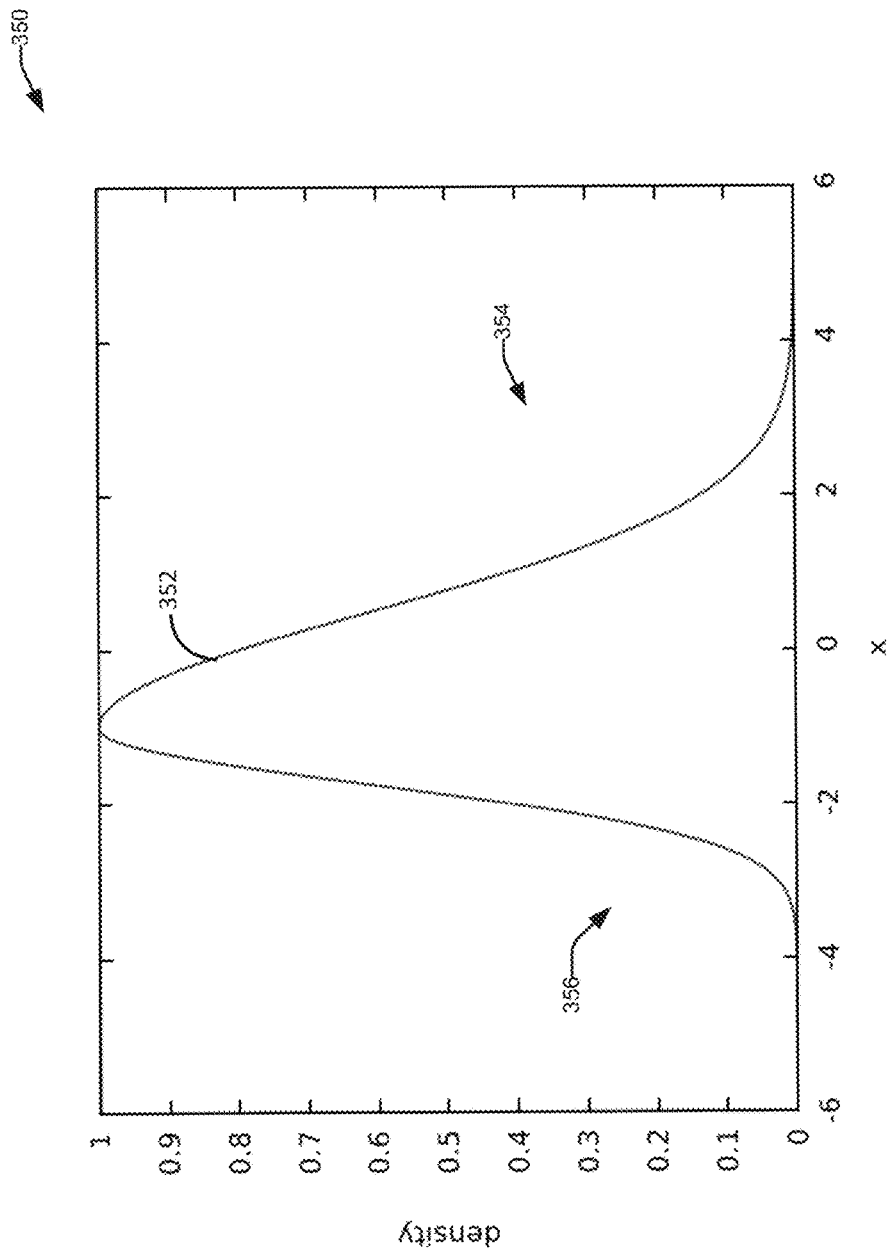
FIG. 9 is an illustration of one embodiment of a piecewise Gaussian distribution.

One example of a piece-wise Gaussian distribution 350 is shown in FIG. 9. As seen in FIG. 9, the piece-wise Gaussian distribution 350 has an x-axis labelled "x" and a y-axis labelled "density." As depicted in FIG. 9, the units of the x-axis indicate a skill level of the user(s) associated with the piecewise Gaussian distribution 350, with the skill level increasing in a positive correlation with the values of the x-axis. The units of the y-axis, density, indicate a density that describes the likelihood of a random variable selected according to the piecewise Gaussian distribution 350 to take on a value on the x-axis.

The piecewise Gaussian distribution 350 includes a curve 352 that has a first piece 354 forming the right side of the piecewise Gaussian distribution 350, and a second piece 356 forming the left side of the piecewise Gaussian distribution 350. In some embodiments, the mode of the piecewise Gaussian distribution 350 can represent the skill level of the user.

In some embodiments, the a property of the Gaussian distribution, such as, for example, the width of the Gaussian distribution or of the piecewise Gaussian distribution can represent or positively correlate to the level of certainty, and/or can be used to determine an error value. In some embodiments, the level of uncertainty and/or an error value can be mathematically calculated based on one or several variables and/or parameters tied to the Gaussian distribution and/or the piecewise Gaussian distribution 350.

In some embodiments, the piecewise Gaussian distribution 350 can further include a first level of certainty and/or first error value associated with the first piece 354 of the piecewise Gaussian distribution 350, and a second level of certainty and/or a second error value associated with the second piece 356 of the piecewise Gaussian distribution 350. In such embodiments, the width of the Gaussian distribution and/or piecewise Gaussian distribution 350, and/or the width of one or both of the pieces 354, 356 of the piecewise Gaussian distribution 350 can vary in a positive relation with the level of uncertainty and/or with the error value. Thus, as the width decreases, the level of uncertainty and/or the error value decreases, and as the width increases, the level of uncertainty and/or the error value increases.

In some embodiments, the first piece 354 and the second piece 356 can have different properties to represent different traits of one or several users. Specifically, and as seen in FIG. 9, the tail of the first piece 354 of the piecewise Gaussian distribution 350 extend farther than the tail of the second piece 356 of the piecewise Gaussian distribution 350. In some embodiments, this servers to provide a semi-ratcheting effect to changes to the piecewise Gaussian distribution 350 when either desired responses or undesired responses are received. Specifically, this semi-ratcheting effect results in a user's skill level more quickly increasing when a desired response is received than decreasing when an undesired response is received. This can, in some embodiments, correlate to the user property of accepting data, or more specifically, gaining knowledge faster than losing knowledge.

Figure 10:
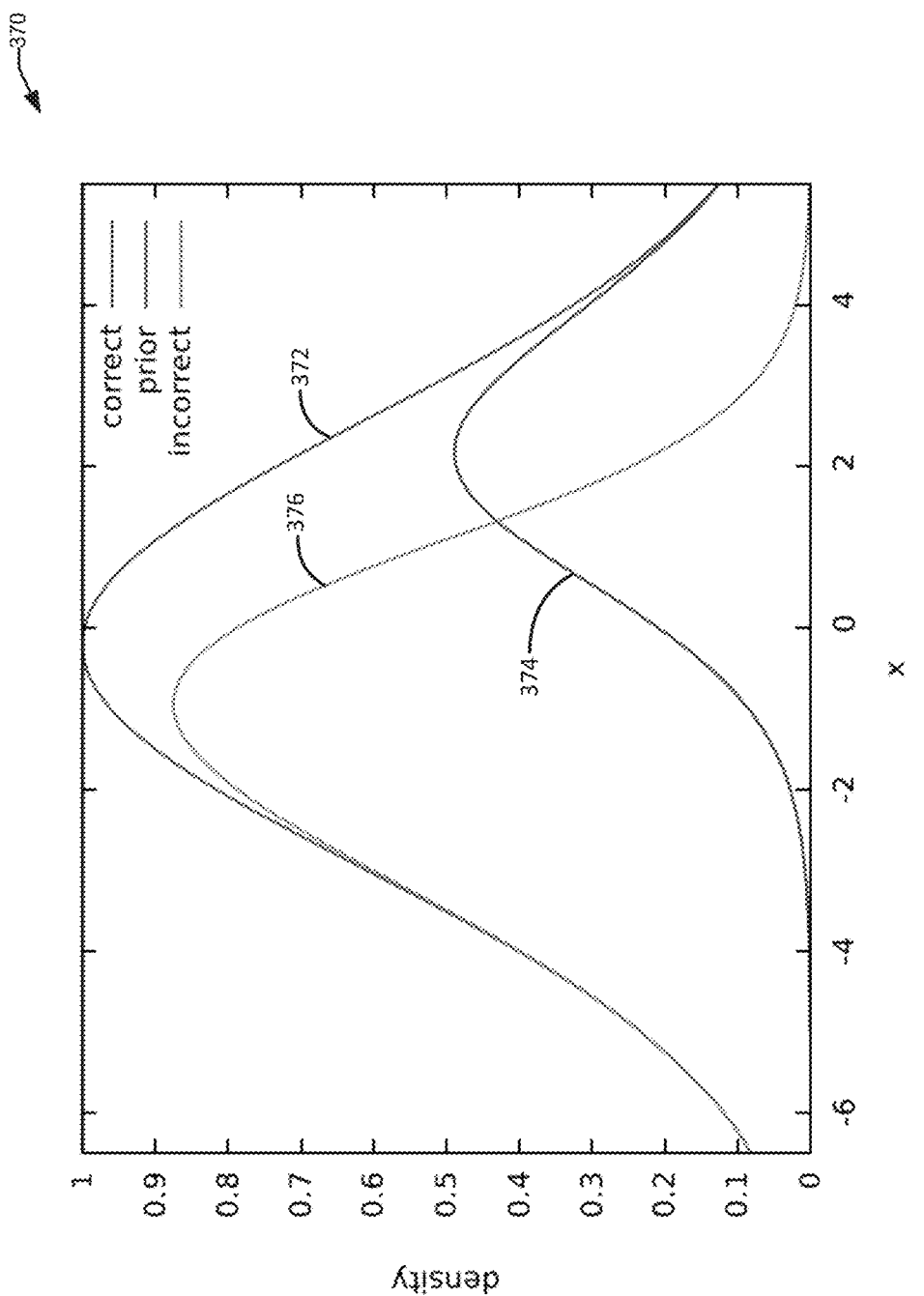
FIG. 10 is an illustration of one embodiment of a plurality of piecewise Gaussian distributions.

This semi-ratcheting effect is illustrated in FIG. 10 which depicts a plurality of piecewise Gaussian distributions 370. The plurality of piecewise Gaussian distributions 370 includes a prior distribution 372, a correct distribution 374, which is the Gaussian distribution resulting from receipt of a desired response to an assessment data packet, and an incorrect distribution 376, which is the piecewise Gaussian distribution resulting from receipt of an undesired response to an assessment data packet.

As depicted in FIG. 10, the prior response has a mode of −0.2, and thus depicts a user skill level of −0.2. This skill level shifts, in response to the received desired response to 2.2, and shifts, in response to the received undesired response of −1.5. Thus, the semi-ratcheting effect of the piecewise Gaussian distribution is that the skill level increase a total of 2.5 as a result of the received desired response and only decreases a total of 1.3 as a result of the received undesired response. As further seen, each of the correct and incorrect distributions 374, 376 is narrower than the prior distribution 372, indicating lower levels of uncertainty and greater levels of certainty associated with those models. In some embodiments, the degree to which the width of the piece-wise Gaussian distribution 350 can shrink can be limited. In some embodiments, for example, the first piece 354 of the piece-wise Gaussian distribution 350 can be prohibited from having a scale factor smaller than, for example, approximately: 3.0; 2.5; 2.0; 1.75; 1.5; 1.25; 1.0; 0.75; 0.5; 0.25; and/or any other or intermediate value, and in some embodiments, for example, the second piece 356 of the piece-wise Gaussian distribution 350 can be prohibited from having a scale factor smaller than, for example, approximately: 3.0; 2.5; 2.0; 1.75; 1.5; 1.25; 1.0; 0.75; 0.5; 0.25; 0.15; 0.1; 0.05; and/or any other or intermediate value. As used herein, "approximately" identifies a range about the therewith associated value, which range is +/−25%, 20%, 15%, 10%, 5%, and/or any other or intermediate percent of that therewith associated value.

After the attributes of the user and/or the next objective have been identified, the process 430 proceeds to block 446, wherein a data packet is selected. In some embodiments, the selected data packet can be an assessment data packet. In some embodiments, the data packet that is selected can be one of the data packets in next objective. In some embodiments, the data packet can be selected from the content library database 303. In some embodiments, the selected data packet, which can be a first data packet, can be randomly selected, and/or selected according to a ranking, an algorithm, or the like. In some embodiments, for example, the data packets in the next objective can be ranked according to difficulty. In some embodiments, selected data packet can be chosen based on its relative ranking. In one embodiment, for example, if the selected data packet is the first data packet selected for the next objective, the selected data packet can have the lowest difficulty, an intermediate difficulty, or the highest difficulty of the data packets in the next objective. In one embodiment in which the selected data packet is the first data packet delivered as part of an assessment, the data packet can have a below average difficulty.

After the data packet has been selected, the process 430 proceeds to block 448, wherein response data is received. In some embodiments, the response data can be received from the user via one or several user devices 106. After the response data has been received, the process 430 proceeds to block 450, wherein the response data is evaluated. In some embodiments, this can include determining whether the desired response or undesired response was received. In some embodiments, the content delivery network 100 can then determine whether the desired response was received by identifying the provided assessment data packet, retrieving answer data associated with that assessment data packet, which answer data identifies desired and/or undesired responses, and compares the answer data to the received response data. In some embodiments, a first value can be associated with the response if a desired response is received, and a second value can be associated with the response if an undesired response is received. In some embodiments, the data packet user data can be updated based on whether the desired response was received and/or based on one or several attributes of the responding user.

After the response data has been evaluated, the process 430 proceeds to block 452, wherein the attributes are updated. In some embodiments, this can include updating the user attributes to reflect a new skill level and/or new confidence level or error value, and in some embodiments, this can include updating the objective and/or data packet data to reflect a new difficulty level and/or new confidence level or error value.

In some embodiments, the user data can be updated to reflect the desired or undesired response received. In some embodiments in which the user provides an undesired response, the user skill level can stay the same and/or be negatively changed, and in some embodiments in which the user provides the desired response, the user skill level can positively change. In some embodiments, the user skill level can be changed according to one or several predictive models which can be, for example, one or several probabilistic models.

In some embodiments in which one or several user attributes and/or objective or data packet attributes are modeled according to a Gaussian distribution and/or a piecewise Gaussian distribution, these models can be updated using a mathematical approach including, for example, a Bayesian approach. In such an embodiment, the updated model 374, 376 can be determined based on the combination of prior model 372 and the calculated probability of the user providing the desired response to the provided data packet.

In one embodiment, for example, the likelihood of the user providing the desired response can be based on the user skill level and/or the difficulty of the data packet, and can be determined using an Item Response Theory ("IRT") model such as, for example, a Rasch model and/or a sigmoid and/or logistic curve. This probability of correctly answering the question can be input into, for example, a Gaussian model of the student skill level, which Gaussian model can be updated according to a Bayesian technique to estimate a new student skill level.

After the additional data has been updated, the process 430 proceeds to decision state 454, wherein it is determined if there are any additional data packets. In some embodiments, this can include determining whether there are any other data packets for providing to the user and/or whether the user has completed the objective. In some embodiments, the objective can be completed when the user has mastered the content of the objective, when the user has exhausted all of the data packets of the objective, and/or when the user has failed to master the objective in a predetermined time.

If it is determined that there are additional questions, then the process 430 returns to block 446, and proceeds as outlined above. If it is determined that there are no additional questions, then the process 430 proceeds to block 456, and the user data is updated to reflect either completion or non-completion of the object and an alert is generated and/or provided.

In some embodiments, the alert can be generated by the server 102. The alert can be provided to at least one of the user devices 106 and/or the supervisor device 110. In some embodiments, an alert, containing information relevant to the user and the objective, can be the user to output the results of the user's work and/or can be outputted to a user-supervisor such as a teacher, instructor, trainer, or any other individual responsible for the user's progress in mastering one or several objectives.

In some embodiments, for example, the providing of this alert can include the identification of one or several user device 106 and/or user accounts associated with the user. After these one or several user devices 106 and/or user accounts have been identified, the providing of this alert can include determining a user location of the user based on determining if the user is actively using one of the identified user devices 106 and/or accounts. If the user is actively using one of the user devices and/or accounts, the alert can be provided to the user via that user device 106 and/or account that is actively being used. If the user is not actively using a user device 106 and/or account, a default device, such as a smart phone or tablet, can be identified and the alert can be provided to this default device. In some embodiments, the alert can include code to direct the default device to provide an indicator of the received alert such as, for example, an aural, tactile, or visual indicator of receipt of the alert.

Figure 11:
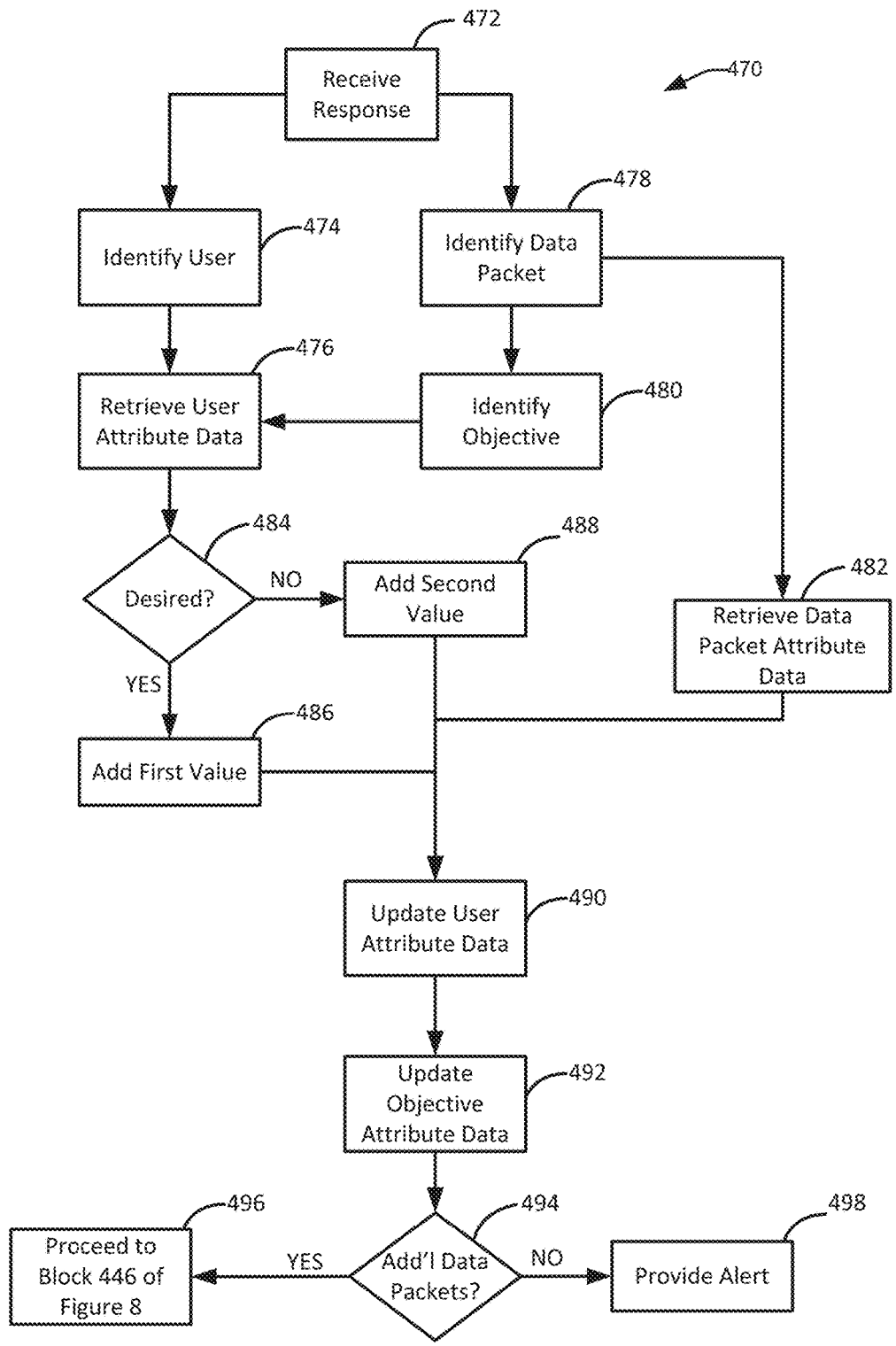
FIG. 11 is a flowchart illustrating one embodiment of a process for updating user data.

With reference now to FIG. 11, a flowchart illustrating one embodiment of a process 470 for updating user data is shown. In some embodiments, the process 470 can be performed in the place of, or as a part of block 452 of FIG. 8.

The process 470 can be performed by the content distribution network 100 and/or one or several components of the content distribution network 100. The process 470 begins at block 472 wherein a response is received. In some embodiments, the response can be a user's response to a previously provided assessment data packet. The response can be received by, for example, the server 102 and/or the privacy server 108 from one of the user devices 106. In some embodiments, the response can be received encoded in one or several data-carrying electrical signals. These signals can include information identifying one or several attributes of the user and/or the user device 106 from which the contribution originated. In some embodiments, these attributes can include, for example, an identification of the user and/or the user device 106, indicia of the time of sending or receipt of the response, a location of the user and/or user device and the time of the generation and/or sending of the response, or the like.

After the response has been received, the process 470 proceeds to block 474 wherein the user-originator of the response is identified. In some embodiments, the user-originator of the response can be identified from the information received with the response, which information can identify, for example, the user either directly via, for example, a username, a user identification number, a name of the user, or the like, or indirectly via, for example, an identification of a user device 106 that is used exclusively with respect to the content distribution network 100 by the user. In some such embodiments, information identifying the user can be retrieved from a lookup table with the information identifying the user device 106.

After the user has been identified, the process 470 proceeds to block 476, wherein user data is retrieved and/or received. In some embodiments, the retrieved user data can be the data associated with the user identified in block 474. The user data can include any of the information described above with respect to the user profile database 301, and the user data can be retrieved and/or received from the user profile database 301. In some embodiments, the user data can include information that can be used to determine, for example, a skill level of the user, a learning style of the user, a data acceptance rate of the user, an error value and/or confidence interval, or the like.

Returning again to block 472, after the response has been retrieved, and either simultaneously or non-simultaneously with one or both of steps 474, 475, the process 470 proceeds to block 478, wherein the data packet associated with the response is identified. In some embodiments, the data packet associated with the response can be identified from information encoded in one or several data-carrying electrical signals containing the response, which one or several data-carrying electrical signals can be received by the server 102 from the user device 106.

After the data packet has been identified, and either simultaneously or non-simultaneously with one or both of steps 474, 475, the process 470 proceeds to block 480 wherein the objective associated with the data packet is identified. In some embodiments, information identifying the objective associated with the data packet can also be received in the data-carrying signals containing the response, and in some embodiments, the user data can include information identifying data packet(s) provided to the user including, for example, the last data packet provided to the user.

Returning again to block 478, and after the data packet has been identified, the process 470 can also proceed to block 482, wherein attribute data for the data packet is retrieved and/or received. In some embodiments, this information can be received and/or retrieved from one of the databases 104 including, for example, the content library database 303. In some embodiments, after the attribute data has been retrieved, the difficulty level and/or error level for the data packet can be identified.

Returning again to block 474 and 480, after the user and the objective has been identified, the process 470 proceeds to block 476 wherein user attribute data is retrieved. In some embodiments, the attribute data retrieved in block 476 is specific to the identified user and objective, and in some embodiments, the attribute data is non-specific to one or both of the identified user and objective such as, for example, attribute data specific to the user, but relating to a plurality of objectives. In some embodiments, this user data can identify, for example, the user skill level, at least with respect to the identified objective, and the user error level, likewise at least with respect to the identified objective. In some embodiments, this skill level and/or error level can be specific to the current, identified objective.

After the user attribute data has been retrieved, the process 470 proceeds to decision state 484, wherein it is determined if the desire response was received. In some embodiments, this can include evaluating the response data and determining whether the desired response or undesired response was received. In some embodiments, the content delivery network 100 can determine whether the desired response was received by identifying the provided assessment data packet, retrieving answer data associated with that assessment data packet, which answer data identifies desired and/or undesired responses, and comparing the answer data to the received response data. In some embodiments, a first value can be associated with the response if a desired response is received, and a second value can be associated with the response if an undesired response is received. In some embodiments, the data packet user data can be updated based on whether the desired response was received and/or based on one or several attributes of the responding user.

If it is determined that a desired response was received, then the process 470 can proceed to block 486, wherein a first value is associated with the response and/or with the user data. In some embodiments, this first value can be stored in the user profile database 301. Returning again to decision state 484, if it is determined that the desired response was not received, then the process 470 proceeds to block 488, wherein a second value is associated with the response and/or with the user data. In some embodiments, this second value can be stored in the user profile database 301.

After either of blocks 486, 488, and after block 482, the process 470 proceeds to block 490, wherein the user attribute data is updated. In some embodiments, the updated attribute data can be stored in one of the databases 104 such as, for example, the user profile database 301. In some embodiments, updating the user attribute data can include determining a new skill level for the user and/or determining a new error level for the user. In some embodiments, this can further include generating an updated model for the user, and specifically, can include updating the Gaussian distribution and/or piecewise Gaussian distribution representing the student skill level and/or error level as discussed with respect to block 452 of FIG. 8. In some embodiments, the new student skill level can be located in the range defined by the error of the initial student skill level.

In some embodiments, the new error level can be determined based on the initial error level updated using the Fisher information for the skill level. In such an embodiment, the Fisher information can be positive which can result in the monotonic shrinking of the error.

In some embodiments, the determination of the new error level can include the determination of a new, potential error level and determining whether this new potential error level complies with one or several requirements for the error level. In one embodiment, for example, after the potential error level has been determined, the potential error level can be compared to a threshold value that can be specified by a user via at least one of the user device 106 and the supervisor device 110 and can be stored in the threshold database 310.

In some embodiments, for example, as the new user skill level is found in the range of the previous error level, the user's ability to improve his skill level can be limited if the error becomes too small. In some embodiments, the error is too small if it is less than a predetermined value, or alternatively if it covers less than 3 standard deviations on the Gaussian distribution of user skill levels, less than 2 standard deviations on the Gaussian distribution of user skill levels, less than 1 standard deviation on the Gaussian distribution of user skill levels, less than 0.5 standard deviations on the Gaussian distribution of user skill levels, less than 0.1 standard deviations on the Gaussian distribution of user skill levels, less than a predetermined range of problem difficulties, and/or less than any other or intermediate range. In some embodiments, the threshold value can be based on a scale of the distribution of the error. In some embodiments, if the error drops below the threshold value, then the new error level can be set as the threshold value. Alternatively, if the error does not drop below the threshold value, then the new error level can be the new potential error level.

After the user attribute data has been updated, the process 470 proceeds to block 492, wherein the objective attribute data is updated. In some embodiments, the updated objective attribute data can be stored in one of the databases 104 such as, for example, the content library database 301. In some embodiments, this updating of the objective attribute data can include the updating of the difficulty level and/or error level of one or both of the objective and/or the data packet. In some embodiments, this can include generating an updated model for one or both of the objective and/or the data packet, and specifically, can include updating the Gaussian distribution representing the difficulty and/or error level of one or both of the objective and/or the data packet as discussed with respect to block 452 of FIG. 8. Likewise, in some embodiments, the new difficulty level of one or both of the objective and the data packet can be located in the range defined by the error of the initial difficulty level of that one of the objective and the data packet.

After the objective attribute data has been updated, the process 470 proceeds to decision state 494, wherein it is determined if there are any additional data packets. In some embodiments, this can include determining whether there are any other data packets for providing to the user and/or whether the user has completed the objective. In some embodiments, the objective can be completed when the user has mastered the content of the objective, when the user has exhausted all of the data packets of the objective, and/or when the user has failed to master the objective in a predetermined time.

If it is determined that there are additional questions, then the process 470 proceeds to block 496, and proceeds to block 446 of FIG. 8. If it is determined that there are no additional questions, then the process 470 proceeds to block 498, and the user data is updated to reflect either completion or non-completion of the object and an alert is generated and/or provided.

In some embodiments, the alert can be generated by the server 102. The alert can be provided to at least one of the user devices 106 and/or the supervisor device 110. In some embodiments, an alert, containing information relevant to the user and the objective, can be the user to output the results of the user's work and/or can be outputted to a user-supervisor such as a teacher, instructor, trainer, or any other individual responsible for the user's progress in mastering one or several objectives.

In some embodiments, for example, the providing of this alert can include the identification of one or several user device 106 and/or user accounts associated with the user. After these one or several user devices 106 and/or user accounts have been identified, the providing of this alert can include determining a user location of the user based on determining if the user is actively using one of the identified user devices 106 and/or accounts. If the user is actively using one of the user devices and/or accounts, the alert can be provided to the user via that user device 106 and/or account that is actively being used. If the user is not actively using a user device 106 and/or account, a default device, such as a smart phone or tablet, can be identified and the alert can be provided to this default device. In some embodiments, the alert can include code to direct the default device to provide an indicator of the received alert such as, for example, an aural, tactile, or visual indicator of receipt of the alert.

Figure 12:
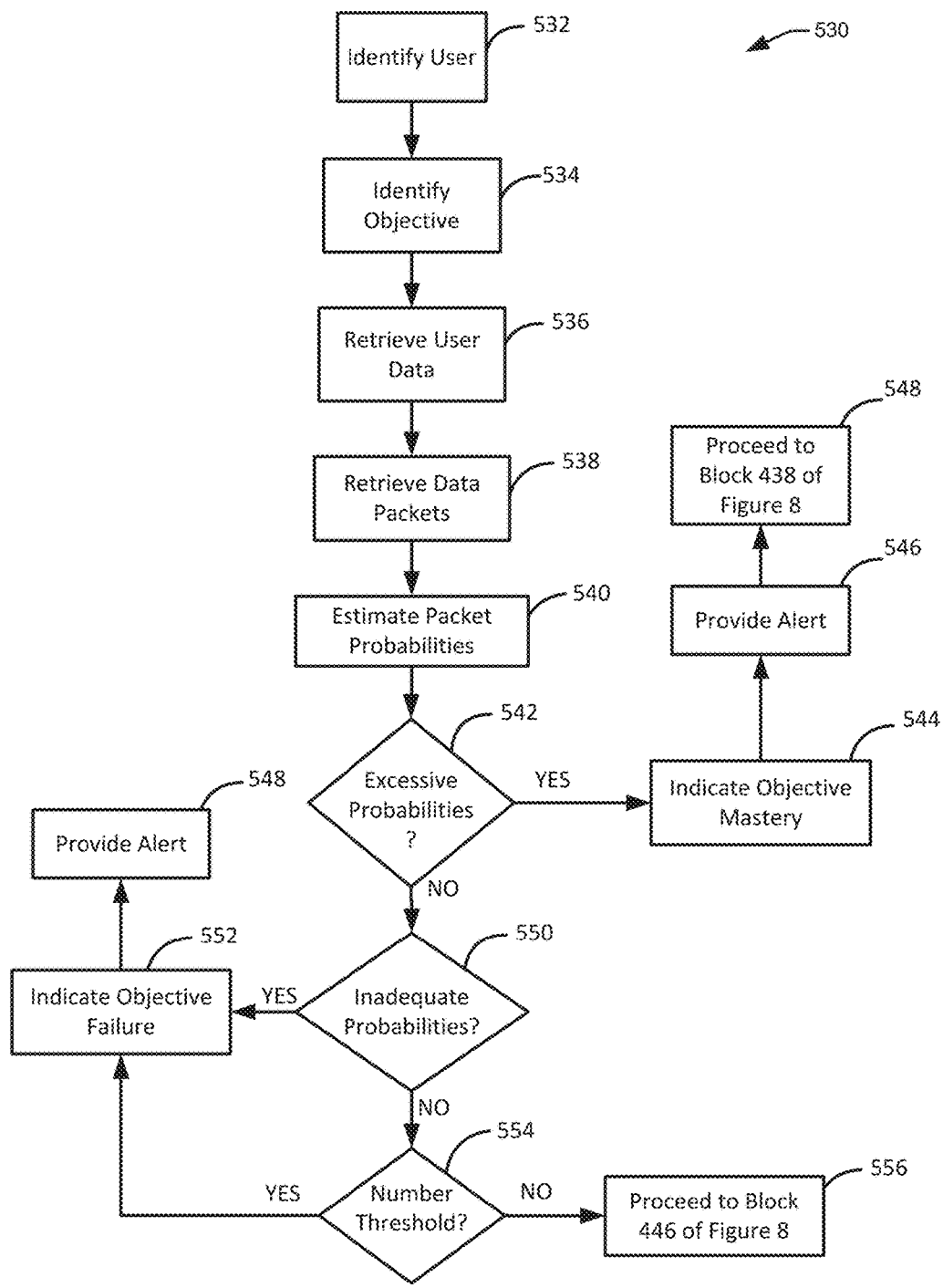
FIG. 12 is a flowchart illustrating one embodiment of a process for determining completion of an objective.

With reference now to FIG. 12, a flowchart illustrating one embodiment of a process 530 for determining completion of an objective is shown. The process 530 can be performed by the content distribution network 100 and/or one or several components of the content distribution network 100. The process 530 begins at block 432 wherein a user is identified. In some embodiments, the user is identified based on one or several data-carrying encoded electrical signals received from the user device 106 when, for example, user is accessing an objective. In some embodiments, the server 102 can extract the data from the data-carrying encoded electrical signals and can user this data to identify the user.

After the user has been identified, the process 530 proceeds to block 534, wherein an objective is identified. In some embodiments, the identified objective can be an uncompleted objective from which the user is currently receiving and/or has received one or several data packets. In some embodiments, the current objective can be identified from information stored in the user profile database 301 identifying one or several objectives that the user has not completed and in which the user is currently receiving and/or has received one or several content items.

After the current objective has been identified, the process 530 proceeds to block 536, wherein user data, and specifically, wherein user attribute data is retrieved and/or received. In some embodiments, the retrieved user data can be the data associated with the user identified in block 532. The user data can include any of the information described above with respect to the user profile database 301, and the user data can be retrieved and/or received from the user profile database 301. In some embodiments, the user data can include information that can be used to determine, for example, a skill level of the user, a learning style of the user, a data acceptance rate of the user, an error value and/or confidence interval, or the like.

After the user data has been retrieved and/or received, the process 530 proceeds to block 538, wherein one or several data packets are retrieved from, for example, the content library database 303. In some embodiments, the one or several retrieved data packets can be the one or several data packets forming the objective and/or the one or several unresponded (by the user identified in block 532) data packets forming the objective identified in block 534. In some embodiments, the data packets, themselves can be retrieved, and in some embodiments, attribute data for those one or several data packets can be retrieved. This attribute data can include any of the data discussed above with reference to content library database 303, and can specifically include attribute data identifying a difficulty level and/or an error level of one or more of the data packets and/or data that can be used to identify a difficulty level and/or error level of one or more of the data packets.

After the data packets have been retrieved, the process 530 proceeds to block 540 wherein packet probabilities are estimated. In some embodiments, a packet probability is calculated for each of some or all of the data packets in the identified objective. The packet probability can define, based on the user skill level and the difficulty of the selected data packet, the likelihood of that user providing the desired response. In some embodiments, this likelihood can be calculated using a Rasch model based off of difficulty and skill level information retrieved from the attribute data of the data packet and the user, respectively. In some embodiments, the probability of the desired response can be calculated according to the following equation:

$$P(Y_{ji} = 1 \mid b, x) = \frac{1}{1 + e^{-(\theta_{ji} - b_i)}}$$

In this equation, P is the probability of the user providing the desired response to the assessment data packet, which desired response is indicated in the equation by $Y_{ji}=1$. As used in the equation, j identifies the user, and i identifies the data packet. Further, $\theta_{ji}$ indicates the skill level of the user j for item i, and $b_i$ indicates the difficulty of the item, i.

In some embodiments, the calculation of the packet probabilities can include selecting one of the data packets for the object, determining the mode of the piecewise Gaussian distribution to identify the skill level of the user, determining the mode of the Gaussian distribution to determine the difficulty level of the data packet, and calculating the probability of the desired response by application of the Rasch method, in the form of the above identified equation, to the difficulty and skill levels. After the data packet probability for the selected packet has been calculated, the data packet probability can be stored in one of the databases 104 such as, for example, content library database 303 or the model database 309. The data packets in the objective can then be evaluated to determine if a packet probability has been calculated for each of the packets. If some of the data packets are identified as not having a calculated packet probability, then one of those data packets can be selected, and the above outline process can be repeated. Further data packets can be selected, and the above outlined process can be completed until all, or a desired number of data packets have had their packet probability calculated.

After the packet probabilities have been calculated, the process 530 proceeds to decision state 542, wherein it is determined if the probabilities are excessive. In some embodiments, this can include determining if the packet probability, and thus the likelihood of the user providing the desired response, of each of the data packets, or of a desired number or percentage of the data packets is so high as to indicate user mastery of the objective. In some embodiments, this determination can be performed by retrieving a mastery percent threshold from one of the databases 104 such as, the threshold database 310. In some embodiments, the mastery percent threshold can delineate between packet probabilities that are sufficiently high to indicate mastery and packet probabilities that are insufficiently high to indicate master. After the threshold database has been retrieved, the packet probabilities can be compared with the mastery percent threshold. In some embodiments, a first value indicative of mastery can be associated with a data packet when its packet probability exceeds the mastery percent threshold, and a second value indicative of non-mastery can be associated with the data packet when its packet probability does not exceed the mastery percent threshold.

This comparison of the packet probabilities and the mastery percent threshold can be repeated until either all of the data packet probabilities have been compared to the mastery percent threshold, or until a sufficient number or sufficient percent of first values have been associated with data packets so as to indicate mastery of the objective. If excessive probabilities are determined, then the process 530 proceeds to block 544, and mastery of the objective is indicated. In some embodiments, this can include associating of a value indicative of mastery of the objective with the objective. This value can be stored in one of the databases 104 such as, the content library database 303.

After mastery of the objective has been indicated, the process 530 proceeds to block 546, and the user data is updated to reflect mastery of the objective and an alert is generated and/or provided. In some embodiments, the alert can be generated by the server 102. The alert can be provided to at least one of the user devices 106 and/or the supervisor device 110. In some embodiments, an alert, containing information relevant to the user and the objective, can be the user to output the results of the user's work and/or can be outputted to a user-supervisor such as a teacher, instructor, trainer, or any other individual responsible for the user's progress in mastering one or several objectives.

In some embodiments, for example, the providing of this alert can include the identification of one or several user device 106 and/or user accounts associated with the user. After these one or several user devices 106 and/or user accounts have been identified, the providing of this alert can include determining a user location of the user based on determining if the user is actively using one of the identified user devices 106 and/or accounts. If the user is actively using one of the user devices and/or accounts, the alert can be provided to the user via that user device 106 and/or account that is actively being used. If the user is not actively using a user device 106 and/or account, a default device, such as a smart phone or tablet, can be identified and the alert can be provided to this default device. In some embodiments, the alert can include code to direct the default device to provide an indicator of the received alert such as, for example, an aural, tactile, or visual indicator of receipt of the alert.

After the alert has been provided, the process 530 proceeds to block 548, and proceeds to block 438 of FIG. 8. Returning again to decision state 542, if it is determined that the probabilities are not excessive, then the process 530 proceeds to block 550, wherein it is determined if the probabilities are inadequate. In some embodiments, this can include determining if the packet probability, and thus the likelihood of the user providing the desired response, of each of the data packets, or of a desired number or percentage of the data packets is so low as to indicate failure to master the objective. Specifically, in some embodiments, the packet probability for each of the packets can be so low that none of the data packets meets requirements for providing to the user. Thus, the user skill level is determined as inadequate for the objective.

In some embodiments, this determination can be performed by retrieving a failure percent threshold from one of the databases 104 such as, the threshold database 310. In some embodiments, the failure percent threshold can delineate between packet probabilities that are sufficiently low to indicate failure and packet probabilities that are insufficiently low to indicate failure. After the failure threshold has been retrieved, the packet probabilities can be compared with the failure percent threshold. In some embodiments, a first value indicative of failure can be associated with a data packet when its packet probability does not exceed the failure percent threshold, and a second value indicative of non-failure can be associated with the data packet when its packet probability does not exceed the failure percent threshold.

This comparison of the packet probabilities and the failure percent threshold can be repeated until either all of the data packet probabilities have been compared to the failure percent threshold, or until a sufficient number or sufficient percent of first values have been associated with data packets so as to indicate failure of the objective. If insufficient probabilities are determined, then the process 530 proceeds to block 552, and failure of the objective is indicated. In some embodiments, this can include associating of a value indicative of failure of the objective with the objective. This value can be stored in one of the databases 104 such as, the content library database 303. After failure of the objective has been indicated, the process 530 can proceed to block 546 and the user data is updated to reflect failure of the objective and an alert is generated and/or provided as discussed above.

Returning again to decision state 550, if it is determined that the probabilities are not insufficient, then the process 530 proceeds to decision state 554, wherein it is determined if the user has received a number of data packets exceeding the number threshold. This decision can include determining, for example, whether the user has reached and/or exceeded the maximum number of data packets for the objective. In some embodiments, for example, the number of data packets that a user can receive can be capped, and reaching this cap without mastery of the objective can result in failure of the objective.

In some embodiments, this determination can be performed by retrieving a number threshold from one of the databases 104 such as, the threshold database 310. In some embodiments, the number threshold can delineate between numbers of received data packets that are below the cap, and numbers of received data packets that are at or above the cap. After the number threshold has been retrieved, the number of packets provided to the user can be compared with the number threshold. In some embodiments, a first value indicative of too many received data packets can be associated with the user when the number of received data packets exceeds the number threshold, and a second value indicative of not too many received packets can be associated with the user when the number of received data packets does not exceed the number threshold.

If it is determined that the cap has been reached or surpassed, then the process 530 proceeds to block 552, and failure of the objective is indicated. In some embodiments, this can include associating of a value indicative of failure of the objective with the objective. This value can be stored in one of the databases 104 such as, the content library database 303. After failure of the objective has been indicated, the process 530 can proceed to block 546 and the user data is updated to reflect failure of the objective and an alert is generated and/or provided as discussed above. Alternatively, if it is determined that the cap has not been reached or surpassed, the process 530 proceeds to block 556, and proceeds to block 446 of FIG. 8.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for alerting a student device when a learning objective is mastered according to a piecewise Gaussian distribution updated according to a Bayesian method, the system comprising:
   a student device;
   a server connected to the student device over a network and configured to:
      receive a student identification from the student device identifying a student using the student device;
      retrieve student attribute data, wherein the student attribute data comprises a piecewise Gaussian distribution model of a student skill level and a student error level;
      identify an uncompleted objective, wherein the objective comprises a plurality of assessment data packets;
      retrieve a difficulty level for the plurality of assessment data packets in the objective;
      estimate a probability of the student overcoming each of the plurality of assessment data packets with a probabilistic model and using:
         the difficulty level of the assessment data packets; and
         the student skill level; and
      identify that the probability exceeds a pre-determined threshold;
      update the student attribute data according to a Bayesian method to produce updated attribute data, wherein the updated attribute data updates the piecewise Gaussian distribution model; and
      generate and provide an alert to the student device and/or a third-party device indicating mastery of the objective, wherein the alert comprises a code to direct the student device to provide an indicator of the alert.

2. The system for alerting the student device when the learning objective is mastered according to a piecewise Gaussian distribution updated according to a Bayesian method of claim 1, wherein the probabilistic model is an Item Response Theory model.

3. The system for alerting the student device when the learning objective is mastered according to a piecewise Gaussian distribution updated according to a Bayesian method of claim 1, wherein the difficulty level is based on a Gaussian distribution model of a difficulty of the plurality of assessment data packets.

4. The system for alerting the student device when the Beaming objective is mastered according to a piecewise Gaussian distribution updated according to a Bayesian method of claim 1, wherein the server is further configured to determine the student skill level by determining a mode of the piecewise Gaussian distribution.

5. The system for alerting the student device when the learning objective is mastered according to a piecewise Gaussian distribution updated according to a Bayesian method of claim 1, wherein the server is further configured to determine the difficulty level by determining a mode of the piecewise Gaussian distribution.

6. The system for alerting the student device when the learning objective is mastered according to a piecewise Gaussian distribution updated according to a Bayesian method of claim 1, wherein:
   the third-party device is a teacher device, wherein the teacher device is connected to the server.

7. The system for alerting the student device when the learning objective is mastered according to a piecewise Gaussian distribution updated according to a Bayesian method of claim 1, wherein an indicator of the alert comprises one: an aural indicator; a tactile indicator; and a visual indicator.

8. A processor-based method for alerting a student device when a learning objective is mastered according to a piecewise Gaussian distribution updated according to a Bayesian method, the method comprising:
   connecting a student device to a server connected over a network;
   receiving, by the server, a student identification from the student device identifying a student using the student device:
   retrieving, by the server, student attribute data, wherein tire student attribute data comprises a piecewise Gaussian distribution model of a student skill level and a student error level:
   identifying, by the server, an uncompleted objective, wherein the objective comprises a plurality of assessment data packet;
   retrieving, by the server, a set difficulty level the plurality of assessment data packets in the objective;
   estimating, by the server, a probability of the student overcoming each of the plurality of assessment data packets with a probabilistic model and using:
      the difficulty level of the assessment data packets: and
      the student skill level; and
   identifying, by the server, that the probability exceeds a pre-determined threshold;
   updating, by the server, the student attribute data according to a Bayesian method to produce updated attribute data, wherein the updated attribute data updates the piecewise Gaussian distribution model; and
   generating and providing, by the server, an alert to the student device and/or a third-party device indicating mastery of the objective, wherein the alert comprises a code to direct the student device to provide an indicator of the alert.

9. The method of claim 8, wherein the probabilistic model is an Item Response Theory model.

10. The method of claim 8, wherein the difficulty level is based on a Gaussian distribution model of a difficulty of the plurality of assessment data packets.

11. The method of claim 8, further comprising determining the student skill level by determining a mode of the piecewise Gaussian distribution.

12. The method of claim 8, further comprising determining the difficulty level by determining a mode of the piecewise Gaussian distribution.

13. The method of claim 8, wherein the third-party device is a teacher device, and further comprising:
   generating and providing the alert to the teacher device connected to the server over the network.

14. The method of claim 8, wherein an indicator of the alert comprises one: an aural indicator; a tactile indicator, and a visual indicator.

15. One or more non-transitory tangible computer-readable storage media storing computer-executable instructions for performing a computer process on a computing system for alerting a student device when a learning objective is mastered according to a piecewise Gaussian distribution updated according to a Bayesian method, the computer process comprising:
   connecting a student device to a server connected over a network;
   receiving, by the server, a student identification from the student device identifying a student using the student device;

retrieving, by the server, student attribute data, wherein the student attribute data comprises a piecewise Gaussian distribution model of a student skill level and a student error level;

identifying, by the server, an uncompleted objective, wherein the objective comprises a plurality of assessment data packet;

retrieving, by the server, a difficulty level the plurality of assessment data packets in the objective;

estimating, by the server, a probability of the student overcoming each of the plurality of assessment data packets with a probabilistic model and using;

the difficulty level of the assessment data packets; and the student skill level; and identifying, by the server, that the probability exceeds a pre-determined threshold;

updating, by the server, the student attribute data according to a Bayesian method to produce updated attribute data, wherein the updated attribute data updates the piecewise Gaussian distribution model; and generating and providing, by the server, an alert to the student device and/or a third-party device indicating mastery of the objective, wherein the alert comprises a code to direct the student device to provide an indicator of the alert.

16. The computer process of claim 15, wherein the probabilistic model is an Item Response Theory model.

17. The computer process of claim 15, wherein the difficulty level is based on a Gaussian distribution model of a difficulty of the plurality of assessment data packets.

18. The computer process of claim 15, further comprising determining the student skill level by determining a mode of the piecewise Gaussian distribution.

19. The computer process of claim 15, further comprising determining the difficulty level by determining a mode of the piecewise Gaussian distribution.

20. The computer process of claim 15, wherein the third-party device is a teacher device and further comprising:

generating and providing the alert to the teacher device connected to the server over the network.

* * * * *